(12) United States Patent
Chang et al.

(10) Patent No.: US 10,967,666 B2
(45) Date of Patent: Apr. 6, 2021

(54) ENCODING METHOD AND DECODING METHOD USING METAL NANOSTRUCTURES

(71) Applicants: LG Display Co., Ltd., Seoul (KR); Seoul National University R&DB Foundation, Seoul (KR)

(72) Inventors: Ki Seok Chang, Paju-si (KR); Sung Pil Ryu, Paju-si (KR); Ki Tae Nam, Seoul (KR); Wook Sung Kim, Paju-si (KR); Hye Eun Lee, Seoul (KR); Hyo Yong Ahn, Seoul (KR)

(73) Assignees: LG DISPLAY CO., LTD., Seoul (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 31 days.

(21) Appl. No.: 16/608,814

(22) PCT Filed: Apr. 27, 2018

(86) PCT No.: PCT/KR2018/004933
§ 371 (c)(1),
(2) Date: Oct. 25, 2019

(87) PCT Pub. No.: WO2018/199688
PCT Pub. Date: Nov. 1, 2018

(65) Prior Publication Data
US 2020/0189309 A1  Jun. 18, 2020

Related U.S. Application Data

(60) Provisional application No. 62/491,825, filed on Apr. 28, 2017.

(30) Foreign Application Priority Data

Apr. 28, 2017 (KR) .................. 10-2017-0055750

(51) Int. Cl.
*B42D 25/373* (2014.01)
*B42D 25/391* (2014.01)
(Continued)

(52) U.S. Cl.
CPC ......... *B42D 25/373* (2014.10); *B42D 25/391* (2014.10); *C09K 11/06* (2013.01);
(Continued)

(58) Field of Classification Search
CPC .... B42D 25/373; B42D 25/391; B42D 25/00; B82Y 40/00; C08G 73/0206
See application file for complete search history.

(56) References Cited

FOREIGN PATENT DOCUMENTS

| JP | 2005-239863 A | 9/2005 |
|---|---|---|
| JP | 5958842 B2 | 8/2016 |

(Continued)

OTHER PUBLICATIONS

Arum Jung, et al., "Synthesis of 3D Chiral Nanostructures and Their Applications", Polymer science and technology, vol. 27 No. 6 [2016], Korean Polymer Society, 782-787 (p. 6).

(Continued)

*Primary Examiner* — Maurice C Smith
(74) *Attorney, Agent, or Firm* — Polsinelli PC

(57) ABSTRACT

The present disclosure relates to an encoding method and a decoding method using a chiral metal nanostructure. The encoding method according to an aspect of the present disclosure includes preparing a plurality of metal nanostructures having a chiral structure; obtaining the optical data of the plurality of metal nanostructures, and preparing a security medium including the plurality of metal.

17 Claims, 23 Drawing Sheets

(51) Int. Cl.
　　　*C09K 11/06*　　　(2006.01)
　　　*G01N 21/19*　　　(2006.01)
　　　*G01N 21/21*　　　(2006.01)
　　　*B42D 25/29*　　　(2014.01)
　　　*B82Y 15/00*　　　(2011.01)
　　　*B82Y 20/00*　　　(2011.01)
　　　*B82Y 40/00*　　　(2011.01)
　　　*G01N 21/31*　　　(2006.01)
　　　*G02B 27/28*　　　(2006.01)

(52) U.S. Cl.
　　　CPC ............. *G01N 21/19* (2013.01); *G01N 21/21* (2013.01); *G01N 21/3103* (2013.01); *B42D 25/29* (2014.10); *B82Y 15/00* (2013.01); *B82Y 20/00* (2013.01); *B82Y 40/00* (2013.01); *C09K 2211/188* (2013.01); *G02B 27/288* (2013.01)

(56) References Cited

FOREIGN PATENT DOCUMENTS

| | | |
|---|---|---|
| KR | 10-2012-0115298 A | 10/2012 |
| KR | 10-2016-0070745 A | 6/2016 |

OTHER PUBLICATIONS

International Search Report from International Application No. PCT/KR2018/004933 in 2 pages.

(a) (b)

(a) (b)

(a) (b)

(a)

(b)

(a)

(b)

(a)

(b)

ENCODING METHOD AND DECODING METHOD USING METAL NANOSTRUCTURES

CROSS REFERENCE TO RELATED APPLICATIONS

This application is a 35 U.S.C. 371 national stage filing of International Application No. PCT/KR2018/004933 filed on Apr. 27, 2018, which claims priority to U.S. Provisional Application No. 62/491,825 filed on Apr. 28, 2017 and Korean Patent Application No. 10-2017-0055750 filed on Apr. 28, 2017, which the contents of the aforementioned applications are hereby incorporated by reference in their entirety.

BACKGROUND

Field of the Disclosure

The present disclosure relates to an encoding method and decoding method using metal nano structure, and more particularly, an encoding device and an encoding method for forgery prevention or security using a technique for controlling optical characteristics of a metal nano structure.

Description of the Background

Counterfeit goods and forgery documents cause annually loss of more than hundreds of billions of dollars worldwide and serious problems in human health and social order. The market size of anti-counterfeiting technology used to address these issues is steadily increasing in both cryptographic packaging technology, track & trace technology and authentication technology field.

Anti-counterfeiting technology is generally divided into overt, covert, forensic, track & trace purposes. Generally, two or three technologies are used in combination. Overt technology (visible features) is an eye-identifying technology that allows users to instantly identify without expertise or equipment. For example, there is a method using a hologram tag, an optically variable ink, a color shifting ink, and the like. Covert technology (hidden markers) is not visible to the naked eye (covert) that requires expertise or a separate device. For example, transparent ink, an embedded image, a water mark, laser coding, and the like are indistinguishable to the naked eye. Producers other than users can distinguish covert technology, and when covert technology is exposed to the public, encryption value is lost. Forensic technology is a specialized technology that is implemented through scientific methodology as a part of covert technology. For example, there is chemical/biological/DNA/Micro Taggant. However, the above-mentioned conventional techniques are easy to reproduce, and thus two or three methods are mixed and used.

Meanwhile, track & trace technology requires encoding capacity of $10^5$ to $10^{12}$ by assigning a unique identification number to each product and aims to accumulate database about future product distribution and use. However, the conventional track & trace technology has a low level of reproduction difficulties, which is a concern for security problems and is limited in terms of encoding capacity of $10^3$ to $10^5$, mass productivity and price. Therefore, track & trace technology has its limitations.

Also, serialization, bar code, RFID, and the like are used as track & trace technology in order to identify the location and usage of specific products in addition to the purpose of simple forgery prevention, but its utilization is very limited in terms of its low encoding capacity and price competitiveness.

Because the conventional covert technology can be easily duplicated, there is a high risk of security and counterfeiting, and the conventional forensic technology has limited application in terms of requiring specialized technology and equipment. The conventional track & trace technology is not effective in security, its encoding capacity is low, and related research and development is also very poor. Currently, the demand for track & trace technology is constrained. However, when the internet of things (IoT) is well-used in the future, a larger encoding capacity will be needed for ensuring the identity of each device and tracking security.

SUMMARY

The present disclosure is to provide an encoding method and decoding method using chiral metal nano structure.

Specifically, the present disclosure provides an encoding method for controlling optical characteristics of a metal nanostructure having a chiral structure to utilize various optical data of the metal nanostructure as encoding data.

The present disclosure has an astronomical encoding capacity and uses covert characteristics so that it can be applied to a track & trace encryption technique that cannot be recognized by a general user.

The present disclosure is not limited to the above-mentioned objects, and other objects, which are not mentioned above, can be clearly understood by those skilled in the art from the following descriptions.

In order to solve the above problems, the encoding method according to an aspect of the present disclosure includes: preparing a plurality of metal nanostructures having a chiral structure; obtaining the optical data of a plurality of metal nanostructures, and preparing a security medium including the plurality of metal nanostructures, and it can have an encoding capacity of $10^5$ or greater using the chiral metal nanostructure, In order to solve the above problems, the decoding method according to an aspect of the present disclosure includes: preparing a target medium including a plurality of metal nanostructures having a chiral structure; irradiating polarized light to the plurality of metal nanostructures of the target medium to measure optical data; loading reference optical data previously stored from a storage unit; and comparing the measured optical data with the reference optical data.

Other detailed matters of the aspects are included in the detailed description and the drawings.

The present disclosure can provide a new encoding method and a decoding method having anti-counterfeit effects by mixing covert encryption technology and track & trace encryption technology using optical characteristics of metal nanostructures having chiral characteristics as a new encoding method.

The present disclosure utilizes metal nanostructures having chiral characteristics to have an encoding capacity of $10^5$ and mixes metal nanostructures having two or more chiral characteristics to provide astronomical encoding capacity.

The effects according to the present disclosure are not limited to the contents exemplified above, and more various effects are included in the present specification.

BRIEF DESCRIPTION OF THE DRAWINGS

The accompanying drawings, which are included to provide a further understanding of the disclosure and are incorporated in and constitute a part of the disclosure, illustrate aspects of the disclosure and together with the description serve to explain the principle of the disclosure.

In the drawings.

DETAILED DESCRIPTION

Figure 1:
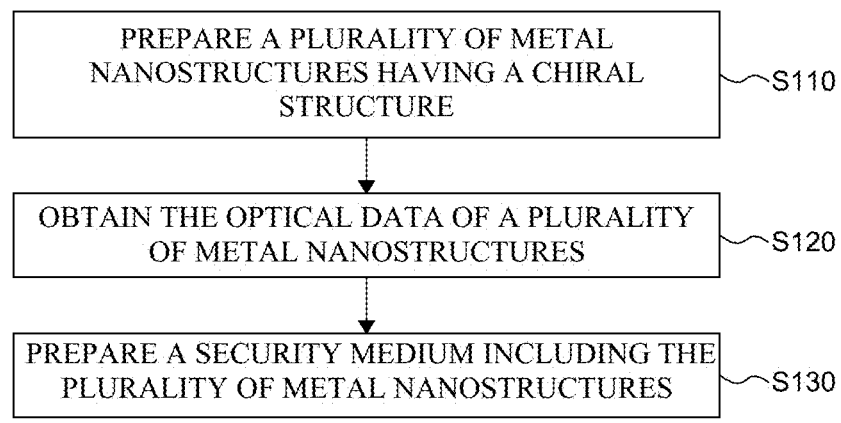
FIG. 1 is a flowchart for explaining an encoding method using a chiral metal nanostructure according to an exemplary aspect of the present disclosure.

Advantages and characteristics of the present disclosure and a method of achieving the advantages and characteristics will be clear by referring to exemplary aspects described below in detail together with the accompanying drawings. However, the present disclosure is not limited to the following exemplary aspects but may be implemented in various different forms. The exemplary aspects are provided only to complete disclosure of the present disclosure and to fully provide a person having ordinary skill in the art to which the present disclosure pertains with the category of the disclosure, and the present disclosure will be defined by the appended claims.

The shapes, sizes, ratios, angles, numbers, and the like illustrated in the accompanying drawings for describing the exemplary aspects of the present disclosure are merely examples, and the present disclosure is not limited thereto. Like reference numerals generally denote like elements throughout the present specification. Further, in the following description, a detailed explanation of known related technologies may be omitted to avoid unnecessarily obscuring the subject matter of the present disclosure. The terms such as "including," "having," and "consist of" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on", "above", "below", and "next", one or more parts may be positioned between the two parts unless the terms are used with the term "immediately" or "directly" is not used.

When an element or layer is disposed "on" another element or layer, another layer or another element may be interposed directly on the other element or therebetween.

Although the terms "first", "second", and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification.

A size and a thickness of each component illustrated in the drawing are illustrated for the convenience of description, and the present disclosure is not limited to the size and the thickness of the component illustrated.

The features of various aspects of the present disclosure can be partially or entirely bonded to or combined with each other and can be interlocked and operated in technically various ways, and the aspects can be carried out independently of or in association with each other.

Hereinafter, the present disclosure will be described in detail with reference to the drawings.

FIG. 1 is a flowchart for explaining an encoding method using a chiral metal nanostructure according to an exemplary aspect of the present disclosure.

Referring to FIG. 1, the encoding method using a chiral metal nanostructure according to an exemplary aspect of the present disclosure includes a step S110 of preparing a plurality of metal nanostructures having a chiral structure, a step S120 of obtaining optical data of the plurality of metal nanostructures and a step S130 of preparing a security medium including the plurality of metal nano structures.

First, the plurality of metal nanostructures having a chiral structure is prepared (S110).

A chiral metal nanostructure refers to a nano-sized metal structure having a three-dimensional chiral structure. The chiral structure means a structure in which its enantiomers do not overlap with each other. For example, a metal nanostructure having a chiral structure may have a twisted shape in one direction. In other words, the metal nanostructure may have a shape in which the corner of the metal nano structure is bent in one direction. For example, the metal nanostructure may have a helicoid shape formed such that its corners are twisted in one direction. The specific shape and properties of the metal nanostructure having a chiral structure are described below.

Figure 2:
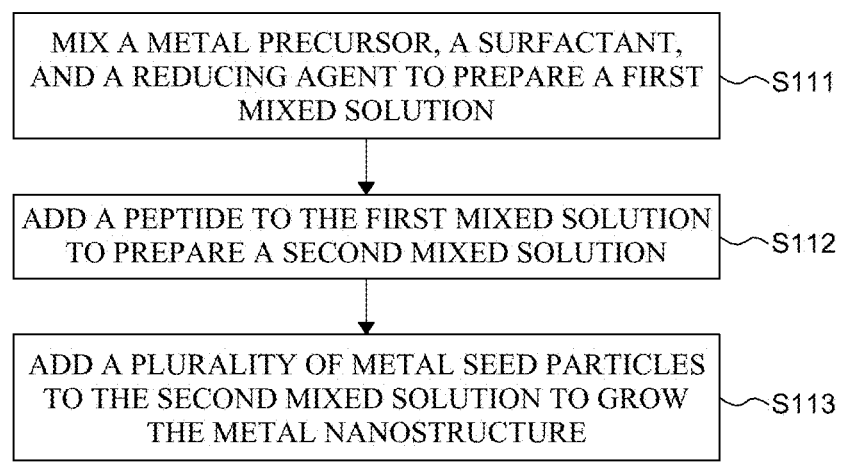
FIG. 2 is a flowchart for explaining the step of preparing a chiral metal nanostructure more specifically.

The metal nano structure having a chiral structure may be prepared by a seed mediated growth method. Specifically, metal seed particles as a starting material, a metal precursor for growth of a metal, and a peptide inducing a chiral structure may be used to prepare the metal nano structure having a chiral structure. A more specific method of preparing a metal nano structure having a chiral structure is described with reference to FIG. 2, FIG. 2 is a flowchart for explaining the step of preparing a chiral metal nano structure more specifically;

Referring to FIG. 2, the step of preparing a plurality of metal nanostructures having a chiral structure includes: a step of mixing a metal precursor, a surfactant, and a reducing agent to prepare a first mixed solution (S111), a step of adding a peptide to the first mixed solution to prepare a second mixed solution (S112), and a step of adding metal seed particles to the second mixed solution the metal nanostructure (S113).

First, the metal precursor, the surfactant, and the reducing agent are mixed to prepare the first mixed solution (S111). Specifically, the step of preparing the first mixed solution may include a step of preparing a solution containing a surfactant, a step of mixing the metal precursor and the reducing agent to the solution, and a step of blending the mixture using a vortex mixer.

The metal precursor is a material which is reduced by the reducing agent to form a metal particle. Any metal material which is capable of forming a nano-sized metal nanostructure using a seed mediated growth method can be used without limitation. For example, the metal precursor may be formed of a precursor containing a metal material such as gold, silver, or copper, but is not limited thereto. For example, when a metal nanostructure is formed using gold as a metal material, chloroauric acid ($HAuCl_4$) may be used as the metal precursor.

The surfactant is adsorbed on a metal seed particle to form a bilayer and thus serves as a soft template. Materials used in the technical field may be used as the surfactant. For example, the surfactant may include any one selected from the group consisting of cetyltrimethylammonium bromide (CTAB), cetyltrimethylammonium chloride (CTAC), cetylpyridinium chloride (CPC), and polyvinylpyrrolidone (PVP), but is not limited thereto.

The reducing agent reduces the metal ion of the metal precursor and grows the metal on the metal seed particle to be described later. The reducing agent may use, for example, ascorbic acid or a material having an oxidation potential equivalent to that of ascorbic acid, for example, hydroxylamine, hydroquinone, succinic acid, or the like, but is not limited thereto.

Next, the peptide is added to the first mixed solution to prepare a second mixed solution (S112).

The peptide asymmetrically grows the metal on the metal seed particles to be described below to form a metal nanostructure having a chiral structure. Specifically, the peptide is adsorbed on a specific surface among a plurality of surfaces (crystal surfaces) of the metal seed particle and then suppresses the metal ion from being attached on a surface of the metal seed particle to be grown by the reduction of the metal precursor. That is, a speed of growing the metal on a surface of the metal seed particle on which the peptide is adsorbed and on the other surface of the metal seed particle on which the peptide is not adsorbed is controlled to form the metal nanostructure having a chiral structure.

The peptide is a structure containing an amino group and a carboxyl group. Peptides include a monopeptide, which is an amino acid containing one amino group and one carboxyl group, a dipeptide formed by bonding two or more amino acids, and a tripeptide formed by bonding three or more amino acids. Further, the peptide may be an oligopeptide formed by binding less than ten amino acids or a polypeptide formed by binding ten or more amino acids depending on the number of amino acids, but is not limited thereto.

For example, the peptide may include any one selected from the group consisting of cysteine (Cys), glutamate (Glu), alanine (Ala), glycine (Gly), penicillamine, histidine, lysine, ornithine, arginine, aspartic acid, glutamic acid, asparagine, glutathione, and glutamine, but is not limited thereto. Meanwhile, the peptide may include both D- and L-forms which are enantiomers.

The peptide may further include a thiol group (—SH). Specifically, the peptide may have a structure containing the thiol group in a side chain of the amino acid. For example, the peptide containing a thiol group may be cysteine or glutathione, but is not limited thereto.

The thiol group improves an adsorptive power between the peptide and the surface of the metal seed particle. In other words, the peptide containing a thiol group is well adsorbed onto the surface of the metal seed particle and thus the metal may be grown so as to have a chiral structure.

The peptide may be adsorbed on the surface of the metal seed particle. More specifically, the amino group of the peptide may form a physical bond with the surface of the metal seed particle. The peptide has a chiral structure having enantiomers and has different optical properties depending on whether it is a D-form or an L-form. The peptide having a chiral structure is selectively adsorbed on different surfaces of the metal seed particle depending on whether it is a D-form or an L-form.

Next, a plurality of metal seed particles is added to the second mixed solution to prepare a metal nano structure (S113).

The metal seed particle is a metal material having a nanometer (nm) size and is used as a starting material for forming a chiral metal nano structure. Any metal material which is capable of forming a nano-sized metal structure using a seed mediated growth method may be used for the metal seed particle without limitation. The metal seed particle may be formed of a metal material such as gold, silver, or copper and may be formed of the same material as the metal precursor, but is not limited thereto.

The size of the metal seed particle may be 1 nm to 100 nm, but is not limited thereto. Further, the metal seed particle may have various shapes. For example, the metal seed particle may be a nanoparticle having a shape having a high Miller index crystal surface such as a hexoctahedron or may be a nanoparticle having a shape having a low Miller index crystal surface such as cube, octahedron, rhombic dodecahedron, or cuboctahedron.

The crystal surface of a high Miller index refers to a crystal surface satisfying a condition that a Miller index {hkl} indicating a characteristic of the nanoparticle crystal surface is h>k>l>0. In contrast, a low Miller index crystal surface may be a crystal surface having a Miller index of {100}, {111}, and {110} as an example. The crystal surface of the high Miller index may be formed by a sum of integer multiples of the low Miller index crystal surfaces. The nanoparticles formed of the high Miller index crystal surfaces generally have twenty or more surfaces exposed per one particle, and curvature at the corner or vertex coupled to each other of crystal surfaces of the high Miller index may be larger than that of the low Miller index crystal surfaces.

The metal seed particle may be prepared by a seed mediated growth method which is one of the colloidal synthesis methods, but is not limited thereto. For example, the seed mediated growth method may reduce the precursor using a reducing agent in the presence of a surfactant to form the metal seed particle.

The chiral metal nano structure is formed through the step S113. Since the peptide present in the second mixed solution has chiral, when the metal seed particle is added to the second mixed solution, the peptide is regioselectively adsorbed on the surface of the metal seed particle. Thereafter, the simultaneously reduced metal precursor adheres to the metal to grow on the metal seed particle surface. In this case, the growth speed of the metal varies in every position, due to the peptide which is selectively adsorbed on the surface of the metal seed particle. In other words, the metal growth speed is low on the specific surface of the metal seed particle on which a large amount of peptide is adsorbed and the metal growth speed is relatively high on the surface of the metal seed particle on which a small amount of peptide is adsorbed or no peptide is adsorbed. Due to the difference of metal growth speeds between adjacent surfaces of the metal seed particle, the metal may be grown while being bent in a predetermined direction. By doing this, a three-dimensional chiral structure which is twisted in one direction is formed.

Hereinafter, a method for manufacturing a chiral metal nano structure of the present disclosure will be described in more detail through Examples. The structure is described to be more specifically with reference to FIGS. 3A to 3D. However, the following Examples are set forth to illustrate the present disclosure, but the scope of the disclosure is not limited thereto.

Example 1

0.8 mL of hexadecyltrimethylammonium bromide (CTAB) which was a surfactant having a concentration of 100 mM was added into 3.95 mL of water. 0.1 mL of 10 mM tetrachloroauric (III) trihydrate (HAuCl4 3H$_2$O) which was a gold precursor and 0.475 mL of 0.1 M L-ascorbic acid which was a reducing agent were mixed with the above solution, and then the mixture was blended by a vortex mixer for one minute to prepare a first mixed solution. 0.5 µL of 1 mM L-cysteine dissolved in water was added to the prepared first mixed solution, and then the mixture was blended by the vortex mixer for 1 minute to prepare a second mixed solution. The growth started by adding a cube nanoparticle having a size of 45 nm to the second mixed solution and then two hours later, a metal nano structure having a chiral structure controlled by the L-cysteine was synthesized. Thereafter, the resulting metal nanostructure was washed through centrifugation (5000 rpm for 30 seconds).

The preparation of a chiral metal nanostructure according to one exemplary aspect of the present disclosure may undergo an intermediate step in which the cube metal particle having a low Miller index crystal surface used as the metal seed particle is grown to the hexoctahedron having a high Miller index crystal surface. In other words, when the cube metal seed particle having a size of 45 nm was injected into the second mixed solution, the peptide was not immediately adsorbed on the surface of the metal seed particle, but the metal was grown on the surface of the cube metal seed particle to form the hexoctahedron metal particle as an intermediate. Therefore, the peptide was adsorbed on the surface of the hexoctahedron metal particle which was an intermediate to be grown as a metal nano structure having a chiral structure. Hereinafter, a process of forming a metal nanostructure having a chiral structure from the hexoctahedron which is an intermediate material is described.

Figure 3A:
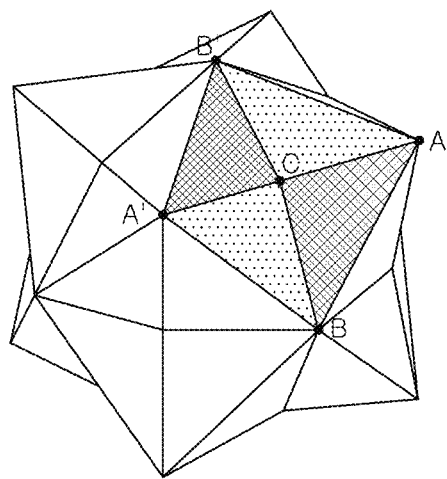
FIGS. 3A to 3D are schematic diagrams and SEM images for explaining a process of forming a chiral metal nanostructure according to Example 1 of the present disclosure.
Figure 3B:
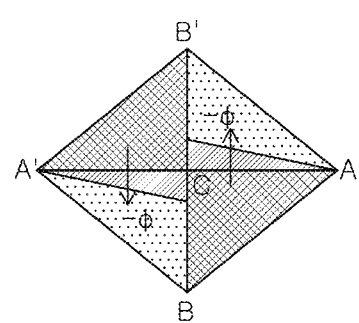
Figure 3B:
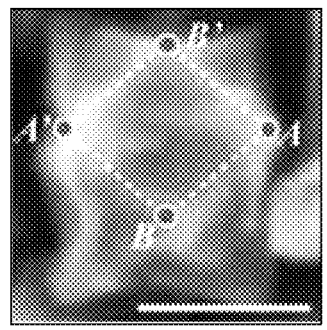
Figure 3C:
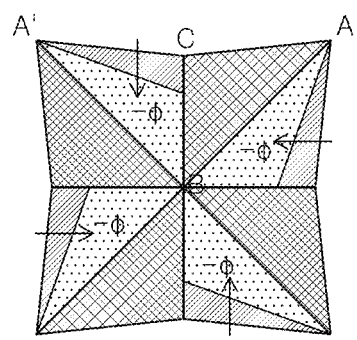
Figure 3C:
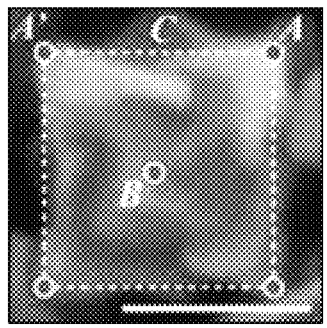
Figure 3D:
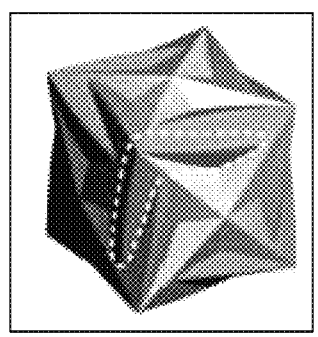
Figure 3D:
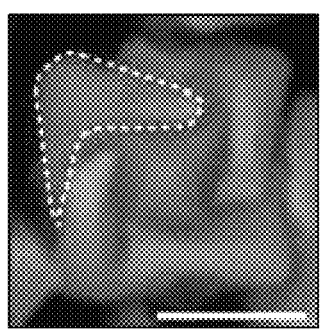

FIGS. 3A to 3D are schematic diagrams and SEM images for explaining a process of forming a chiral metal nano structure according to Example 1. FIG. 3A is a schematic diagram illustrating the hexoctahedron metal particle which is an intermediate material which is formed during the process of forming a chiral metal nanostructure from the cube metal seed particle. FIGS. 3B and 3C are a schematic diagram and an SEM image seen from {110} and {100} directions, respectively, for explaining a behavior of a hexoctahedron metal particle surface in the presence of L-cysteine. FIG. 3D is a schematic diagram and an SEM image for explaining a structure of a chiral metal nanostructure prepared by Example 1.

Referring to FIG. 3A, the hexoctahedron metal particle has a structure enclosed by 48 surfaces having the same size triangular shape and has a high Miller index of {321}. In this case, referring to ABB'A' region, the {321} plane and {231} plane are configured by an R region with a clockwise rotation and an S region with a counterclockwise rotation. The R region and the S region have chirality and may be symmetric to each other with respect to a boundary line. The hexoctahedron metal particle has 24 R regions and 24 S regions to have achirality with respect to the entire particle. In this case, the L-cysteine is known to prefer the R region. When the metal seed particle is added to the second mixed solution, the L-cysteine is mainly adsorbed in the R region of the metal seed particle. Since the L-cysteine mainly occupies the surface of the R region of the metal seed particle, the metal growth speed of the R region is slower than the metal growth speed of the S region.

FIGS. 3B and 3C illustrate a schematic diagram of ABA'B' region configured by two sets of R region and S region and an SEM image in which an area corresponding to the ABA'B' region is represented by the dotted line. Referring to FIG. 3B, the growth of the metal which is transformed at AC and CA' among boundaries of the S region and R region is identified. The transformed metal may be grown at all boundaries of the hexoctahedron. Both the straight lines AC and CA' indicating the boundaries are −φ and are twisted to protrude into the S region. As described above, since the growth of the metal is suppressed by the L-cysteine adsorbed on the surface of the R region, the metal is grown to be directed to the S region at the boundary of the S region and the R region. Therefore, the twisted corner continuously extends toward the inside of the S region.

Referring to FIG. 3D, the chiral metal nanostructure formed in Example 1 has a three-dimensional chiral structure in which the enantiomers do not overlap with each other. Specifically, the chiral metal nanostructure formed in Example 1 has a helicoid shape having a structure in which the corners are twisted to the inner side.

Reference is made to FIG. 4 to describe the structure of a metal nano structure having a chiral structure.

Figure 4A:
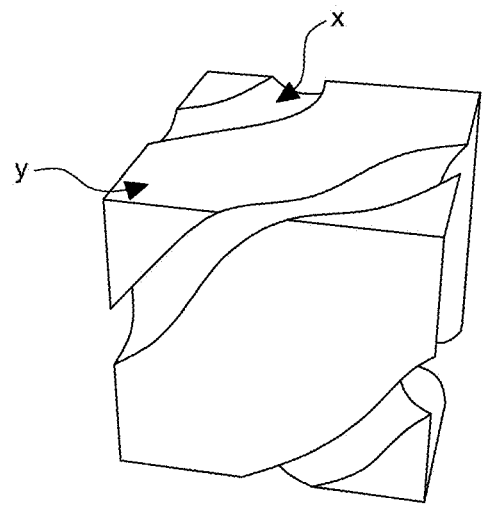
FIGS. 4A to 4C are schematic diagrams and SEM images for explaining the structure of the chiral metal nanostructure.
Figure 4B:
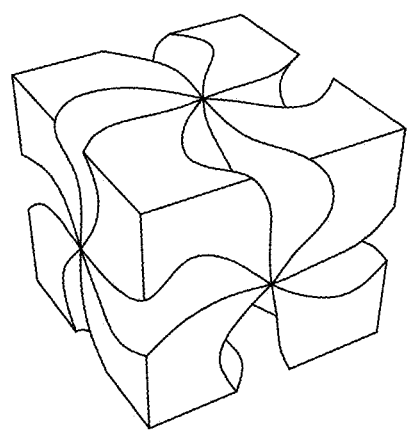
Figure 4C:
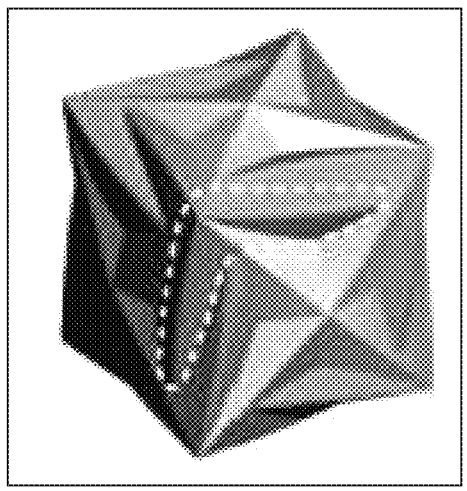

FIGS. 4A to 4C are schematic diagrams and SEM images for explaining the structure of the chiral metal nanostructure.

Referring to FIG. 4A, the metal nano structure having a chiral structure may include a concave portion x and a convex portion y. In this case, the concave portion x may be formed so as to be connected to another adjacent surface. Specifically, the concave portion may be formed to be connected to two or more surfaces and may be formed to be connected to only two surfaces. Referring to FIG. 4B, the metal nanostructure may also include the convex portion which extends to be bent in the same direction with respect to vertexes. The convex portion is formed such that a corner extending from each vertex of the metal nanostructure extends to be twisted in one direction. Therefore, a pinwheel-shaped convex portion may be formed. Further, referring to FIG. 4C, the three-dimensional chiral structure can be represented by a shape in which a corner of the metal nano structure is bent in one direction. For example, the metal nanostructure may have a helicoid shape formed such that a corner is twisted in one direction.

A size of the metal nano structure used in the encoding method of the present disclosure may be 10 nm to 500 nm, or may be 50 nm to 300 nm, but is not limited thereto.

The metal nanostructure used in the encoding method of the present disclosure has a chiral structure and an optical characteristic, that is, an optical activity due to the chiral structure. More specifically, a metal nanostructure having a chiral structure may have a spectroscopically different spectrum depending on the chiral structure. In particular, different spectra are shown by circular dichroism (CD) measurements. Further, when polarized light is irradiated to a metal nanostructure having a chiral structure, color conversion occurs according to the angle of polarization.

The optical characteristics of such metal nanostructures depend on the chiral structure. In other words, the metal nanostructures having different chiral structures may have different light absorption regions for visible light, different polarization characteristics, and different optical activities (g-factors).

Next, a plurality of metal nanostructures having a chiral structure is prepared, and then optical data of a plurality of metal nanostructures are obtained (S120).

Optical data refers to a value obtained by measuring optical characteristics of a metal nanostructure having a chiral structure. As described above, since the metal nanostructure has different optical characteristics according to the chiral structure, it is possible to obtain data of a specific value or spectrum shape of the optical characteristics of the prepared metal nanostructure. The obtained optical data is a specified result due to the chiral structure of the prepared metal nanostructure so that it can be used as an encoding element for encryption.

Specifically, the optical data of the metal nano structure may include (A) spectroscopic data and (B) color conversion pattern data measured from the metal nanostructure.

(A) Spectroscopic data is the result of analyzing the measured spectrum after irradiating polarized light to the prepared metal nanostructure having a chiral structure. For example, the spectroscopic data of the metal nanostructure may be a circular dichroism (CD) spectrum, a g-factor spectrum, or an absorbance spectrum. The spectroscopic data may be data that stores the measured spectrum itself and may be data that stores a value at a specific wavelength. For example, the spectroscopic data may include a plurality of parameters derived from a circular dichroism (CD) spectrum, a g-factor spectrum or an absorbance spectrum, respectively. More specifically, the plurality of parameters may include a frequency, a maximum absorption size, a wavelength, and the like in each spectrum. The encryption method according to an exemplary aspect of the present disclosure can combine the data of astronomical cases from the spectrum measured by polarized light irradiation, thereby greatly increasing the encoding capacity.

Figure 5A:
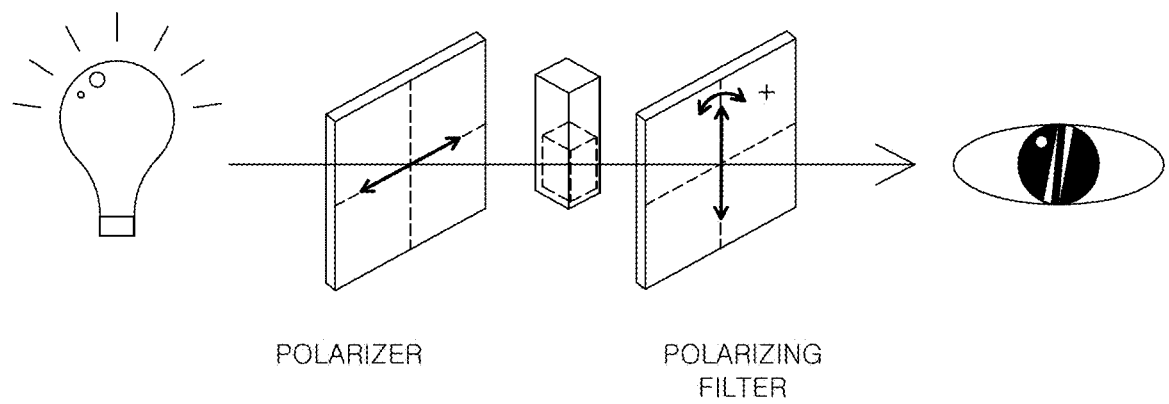
FIG. 5A is a schematic diagram for explaining a method of measuring a color conversion pattern data of a chiral metal nano structure.
Figure 5B:
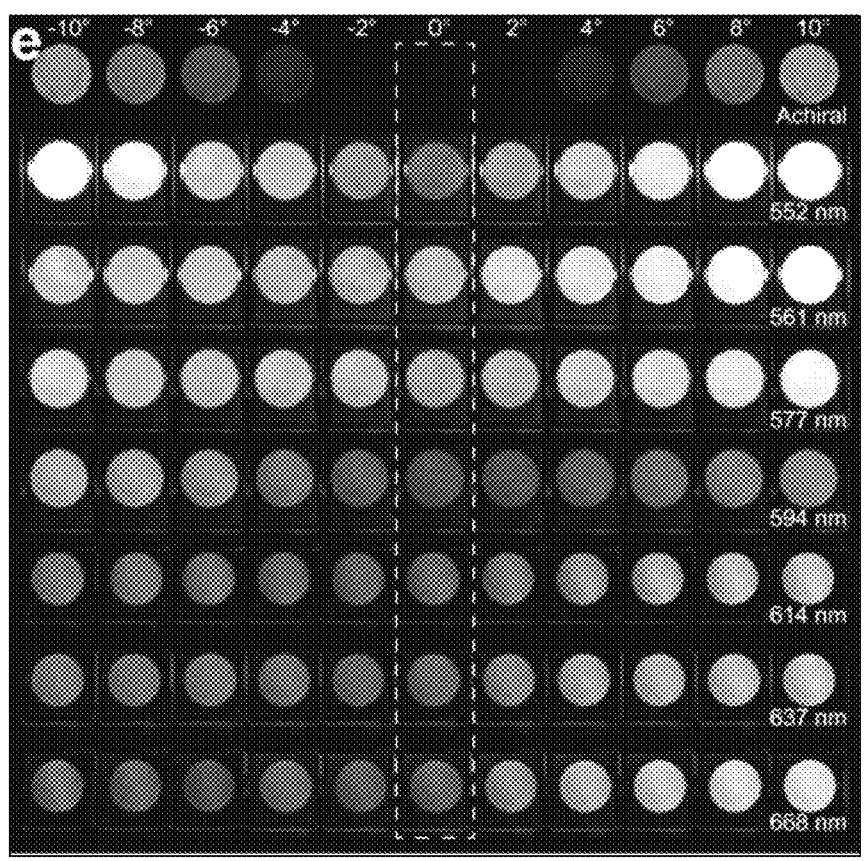
FIG. 5B is an image showing color conversion pattern data of an achiral metal structure and a chiral metal nanostructure according to Example 1 of the present disclosure.

(B) Color conversion pattern data refers to color conversion images measured by optical rotation properties of a metal nanostructure having a chiral structure. Reference is made to FIGS. 5A and 5B to describe the color conversion pattern data.

FIG. 5A is a schematic diagram for explaining a method of measuring a color conversion pattern data of a chiral metal nano structure.

Referring to FIG. 5A, the light emitted from the light source passes through the polarizer to become polarized, and the polarized light is irradiated onto the metal nanostructure sample. The polarized light passing through the metal nanostructure is changed depending on the optical characteristics of the metal nano structure, and the change is observed with a different color. In this case, when the change is observed while the angle of the polarizing filter is rotated, the change in color observed in the naked eye can be confirmed according to the angle of the polarizing filter.

FIG. 5B is an image showing color conversion pattern data of an achiral metal structure and a chiral metal nanostructure according to Example 1.

Generally, in the achiral metal nanostructure, when the angle of the polarizing filter is rotated, only the intensity of the color is different, but the color does not change. However, in the case of the chiral metal nano structure, when the angle of the polarizing filter is rotated, it exhibits a different color depending on the wavelength and the rotated angle.

In the encoding method according to an exemplary aspect of the present disclosure, there is a large number of data values for (A) spectroscopic data and (B) color conversion pattern data so that they may appropriately be used as an encoding element.

Meanwhile, the step of obtaining of optical data of the plurality of metal nanostructures may include the step of irradiating the plurality of metal nanostructures with polarized light to measure the spectroscopic data or the color conversion data and the step of storing the measured spectroscopic data or the color conversion data.

As described above, as optical data, both of the spectroscopic data and the color conversion data can be measured by irradiating the metal nanostructure samples with polarized light. For example, a spectropolarimeter can be used to irradiate polarized light to measure circular dichroism and optical rotatory dispersion.

Next, the measured spectroscopic data or color conversion data are stored. The storage medium for storing the data is not particularly limited, and it is sufficient to use the storage medium used in the corresponding technical field. The stored optical data is used as an encoding element for checking and determining whether or not falsification has occurred in the encoding method for preventing forgery. In other words, in the following decoding method, the stored optical data can be compared with the measured optical data by irradiating the confirmation target medium so as to check whether or not falsification has occurred.

Next, a security medium including the prepared plurality of metal nano structures is prepared (130).

A method for a security medium including a plurality of metal nano structures is not particularly limited, and various methods can be used in accordance with the structure and characteristics of the security medium.

For example, a method of manufacturing an article including a chiral metal nanostructure prepared in the process of preparing a security medium can be used. Specifically, when the security medium is a film, a chiral metal nanostructure is added to film composition, and then a film containing a chiral metal nano structure can be produced through a film forming process. When the security medium is a plastic molded article, a chiral metal nanostructure is added to a pre-molded resin composition, and then a plastic molded article containing a chiral metal nanostructure can be produced through a molding process.

Further, a manner in which the produced plurality of metal nano structures are attached to a security medium may be used. Specifically, a method may be used in which a coating composition containing the prepared plurality of metal nano structures is prepared, and then the composition is coated on a security medium. Further, the prepared metal nanostructure is added to an ink composition, and thus the mixture is used as an ink composition to attach the metal nano structure to security medium. In particular, in the case of the encoding method for detecting counterfeit note, a method of printing using the banknote ink mixed with metal nano structures may be utilized.

The encoding method according to an exemplary aspect of the present disclosure uses a chiral metal nano structure to utilize an optical characteristic of a chiral metal nano structure as an encoding element. Since the metal nanostructures having different chiral structures, respectively, show different optical characteristics, the metal nanostructure having specific optical characteristics can be attached to the security medium to enable encryption on the security medium.

Meanwhile, the chiral structure of the chiral metal nano structure is determined in the step of preparing the metal nanostructure. In other words, the conditions in the step of producing the metal nanostructure may be controlled to prepare chiral metal nanostructures having different optical characteristics. The production method of the chiral metal nanostructure is controlled to prepare chiral metal nanostructures having different optical characteristics. Chiral metal nano structures having different structures from each other can be prepared and then mixed to form a plurality of chiral metal nanostructures having a plurality of chiral structures. The metal nanostructures are utilized to perform the encoding method.

Hereinafter, in the method for preparing a chiral metal nanostructure according to one exemplary aspect of the present disclosure described above, factors which may affect the structure and the optical characteristics of the prepared chiral metal nanostructure are described in more detail.

1. Type of Peptide

The encoding method according to an exemplary aspect of the present disclosure utilizes the optical characteristics of the chiral metal nano structure, and when the chiral metal nanostructures have different shapes, they have different optical characteristics. In this case, the shape of the chiral metal nanostructure is changed according to the kind of the peptide in the step of preparing the chiral metal nano structure, and the optical characteristics of the chiral metal nanostructure are also changed. In other words, the kind of the peptide used is changed to form metal nanostructures having various chiral structures.

Reference is made to FIGS. 6A to 6D to identify metal nanostructures prepared using various kinds of peptides.

Figure 6A:
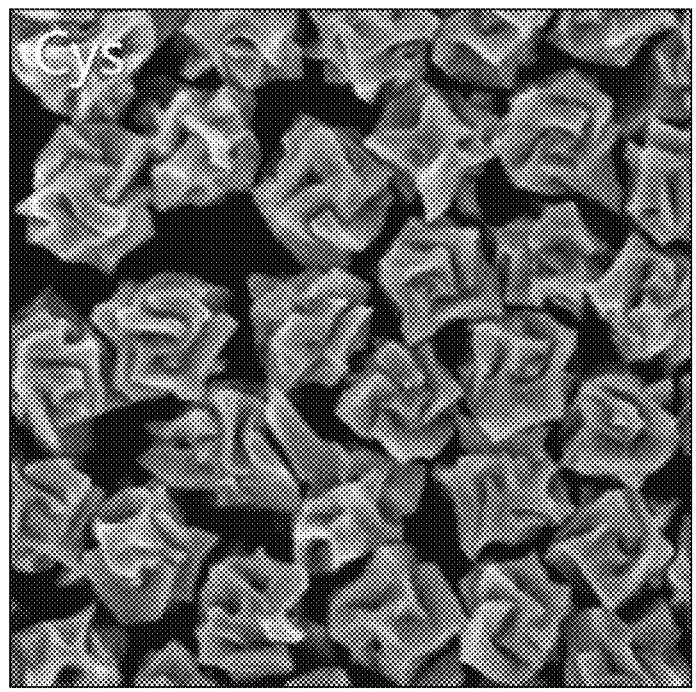
FIGS. 6A to 6D are SEM images and circular dichroism (CD) spectra of a chiral metal nanostructure manufactured using various types of peptides.
Figure 6A:
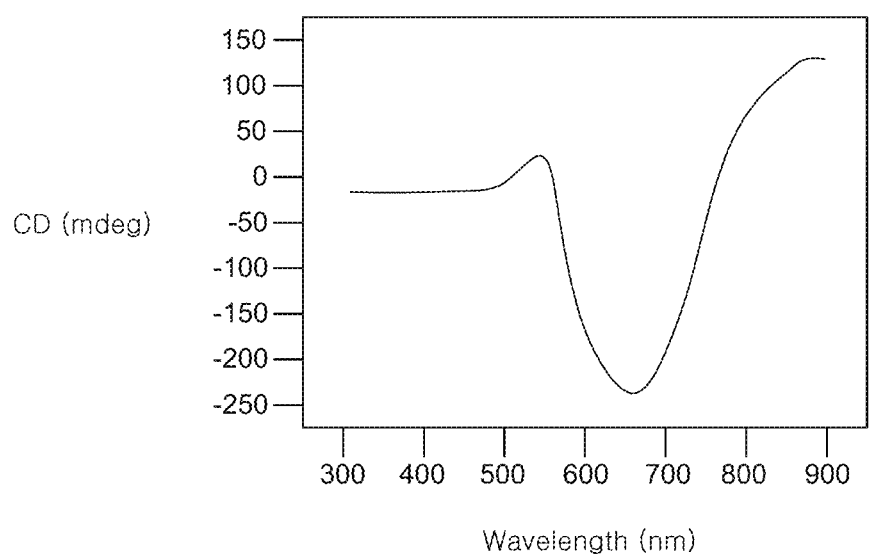
Figure 6B:
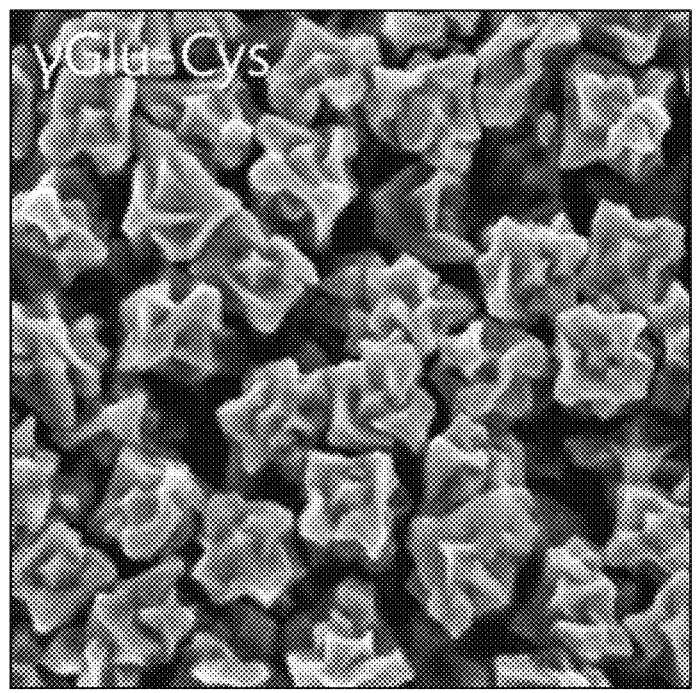
Figure 6B:
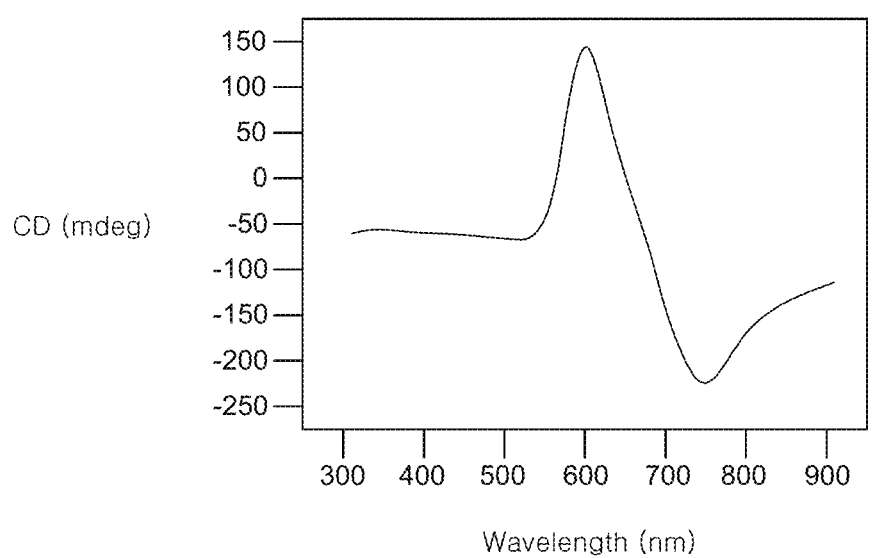
Figure 6C:
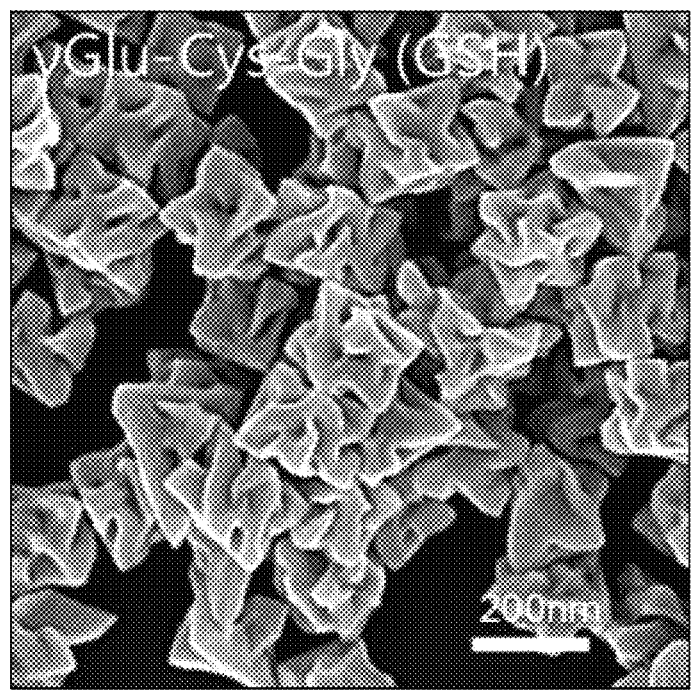
Figure 6C:
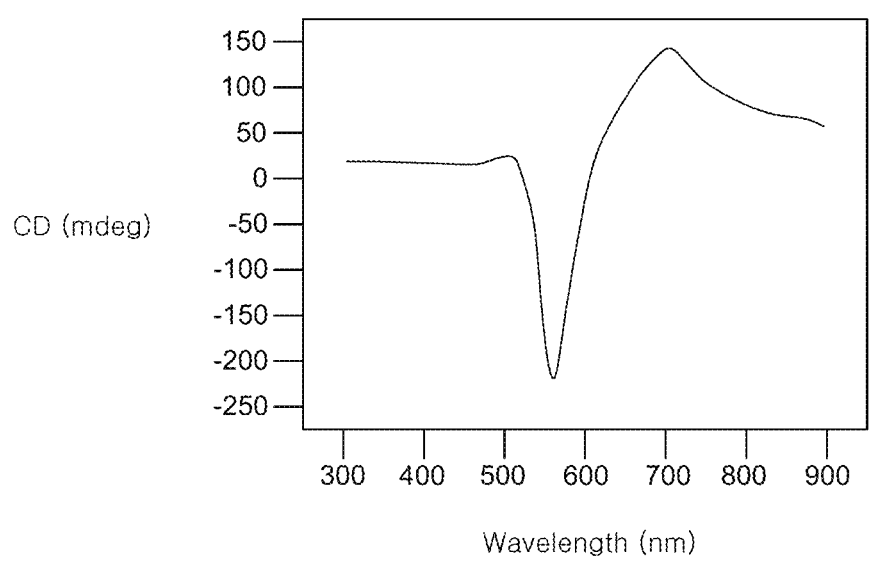

FIGS. 6A to 6D are SEM images and circular dichroism (CD) spectra of a chiral metal nanostructure manufactured using various types of peptides. FIG. 6A is an SEM image and a circular dichroism (CD) spectrum of the metal nano structure produced in Example 1 described above. FIG. 6B is an SEM image and a circular dichroism (CD) spectrum of the metal nanostructure produced in Example 2. FIG. 6C is an SEM image and a circular dichroism (CD) spectrum of the metal nanostructure produced in Example 3.

Example 2

The chiral metal nanostructure is prepared by the same method as Example 1, except that a dipeptide consisting of γ-glutamate and L-cysteine was used instead of L-cysteine.

Example 3

The chiral metal nanostructure is prepared by the same method as Example 1, except that a tripeptide (L-glutathione) consisting of γ-glutamate, L-cysteine and glycine was used instead of L-cysteine.

Comparing 6A to 6C, it can be confirmed that different peptides are used, metal nanostructures having completely different chiral structures and optical characteristics can be formed.

Figure 6D:
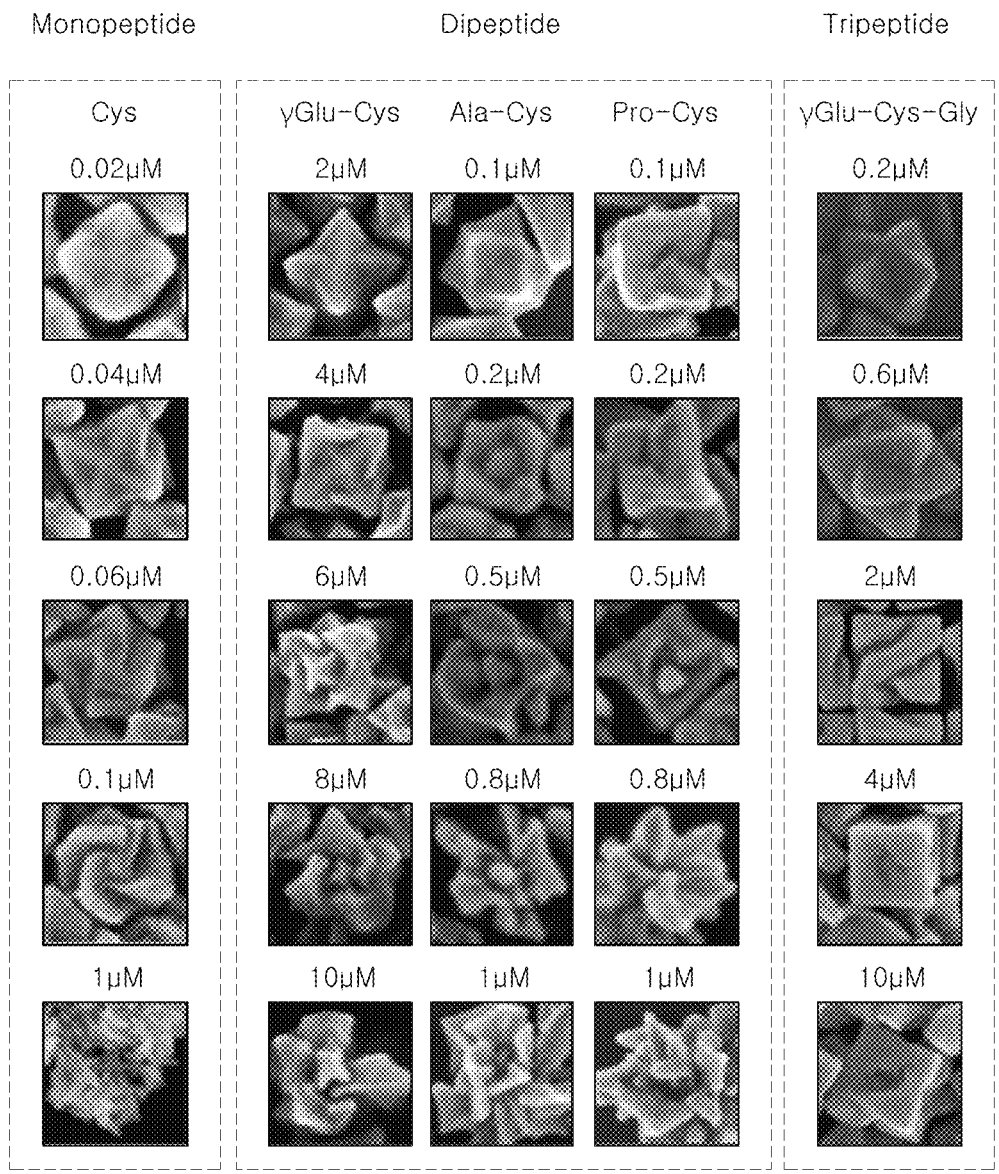

Meanwhile, FIG. 6D shows the structures of various chiral metal nanostructures formed using various monopeptides, dipeptides and tripeptides, and it can be confirmed that the structure of the chiral metal nanostructure varies depending on the concentration of the peptide used.

Figure 7A:
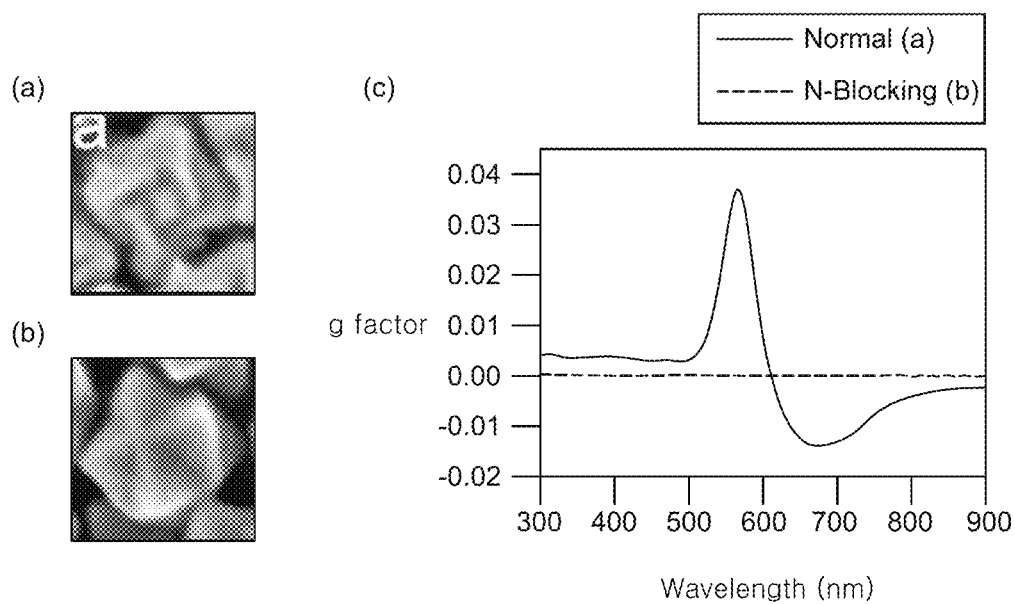
FIGS. 7A and 7B are an SEM image representing that when a structure of peptide is changed, the structure and the optical characteristic of the manufactured chiral metal nanostructure are changed and a graph illustrating a g-factor spectrum.
Figure 7B:
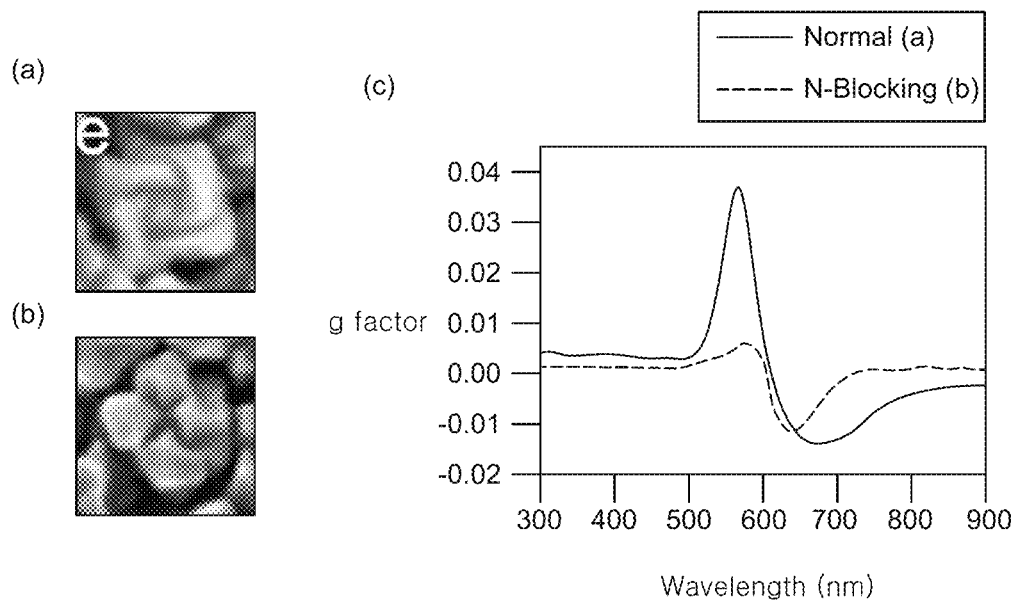

Meanwhile, FIGS. 7A and 7B are an SEM image representing that when a structure of peptide is changed, the structure and the optical characteristic of the manufactured chiral metal nanostructure are changed and a graph illustrating a g-factor spectrum.

Referring to FIG. 7A, the chiral metal nanostructure illustrated in FIG. 7A (a) is an SEM image of a chiral metal nanostructure according to Example 1 which is prepared using L-cysteine. Further, the chiral metal nanostructure illustrated in FIG. 7A (b) is an SEM image of a chiral metal nanostructure prepared using N-terminal blocked L-cysteine, that is, L-cysteine in which hydrogen of an amino group is substituted (for example, N-acetyl cysteine). Referring to FIG. 7A (c), it is confirmed that the N-terminal blocked L-cysteine had an achiral property in which a strength of g-factor spectrum is rapidly reduced.

Referring to FIG. 7B, the chiral metal nanostructure illustrated in FIG. 7B (a) is an SEM image of a chiral metal nanostructure according to Example 1 which is prepared using L-cysteine. Further, the chiral metal nanostructure illustrated in FIG. 7B (b) is an SEM image of a chiral metal nanostructure prepared using C-terminal blocked L-cysteine, that is, L-cysteine in which hydrogen of a side chain is substituted (for example, cysteine ethyl ester). Referring to FIG. 7B (c), it is confirmed that the C-terminal blocked L-cysteine had a chiral property in which a strength of g-factor spectrum is reduced.

As shown in FIGS. 6A to 6D and FIGS. 7A to 7B, chiral metal nanostructures having different structures can be prepared by changing the kind and structure of the peptides in the step of preparing the chiral metal nano structure. Chiral metal nanostructures having different structures have different optical characteristics. By varying the production conditions in the stage of preparing the chiral metal nanostructure, various optical characteristics can be implemented, and the optical characteristics of the chiral metal nanostructure can be encoded by data.

2. D- and L-Forms of Peptide

In the encoding method according to one exemplary aspect of the present disclosure, the optical characteristic of the prepared chiral metal nanostructure is changed depending on the chiral structure of the peptide. When the chiral metal nanostructures are prepared using two peptides which are enantiomers, the formed chiral metal nanostructures may have opposite chiral structures or opposite polarization characteristics.

In order to examine the above description, the chiral metal nanostructures prepared using L-cysteine and D-cysteine which were enantiomers were examined. As a chiral metal nanostructure prepared using the L-cysteine, the metal nanostructure prepared by Example 1 was examined. The chiral metal nanostructure prepared using D-cysteine was prepared by a method according to Example 4 below.

Example 4

The chiral metal nanostructure was prepared by the same method as Example 1 except that D-cysteine was used instead of L-cysteine.

Figure 8A:
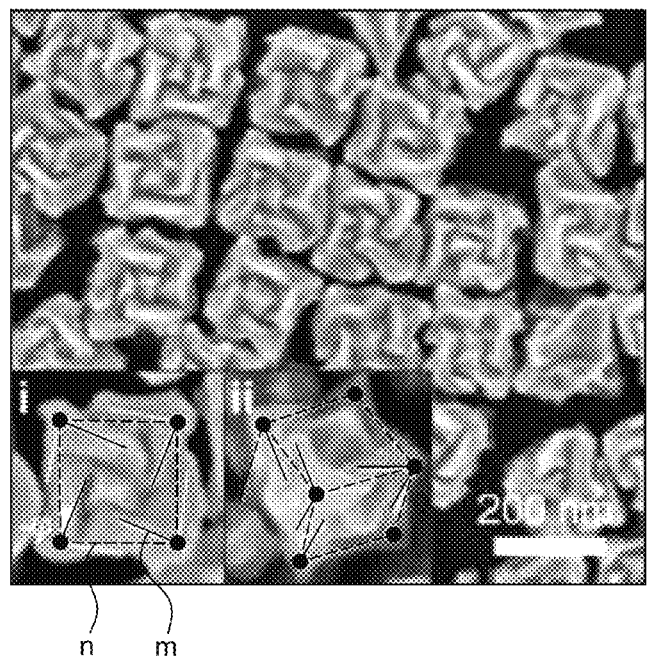
FIG. 8A is an SEM image of a chiral metal nanostructure prepared by Example 1 of the present disclosure.
Figure 8B:
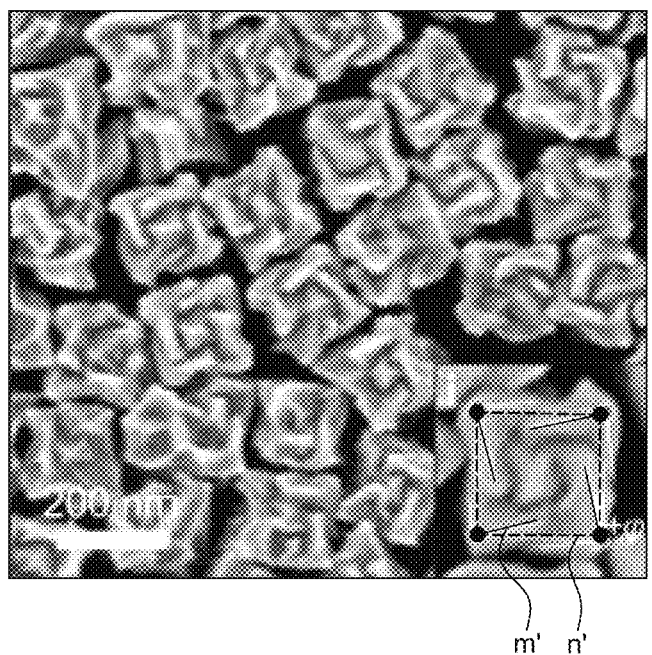
FIG. 8B is an SEM image of a chiral metal nanostructure prepared by Example 4 of the present disclosure.

FIG. 8A is an SEM image of a chiral metal nanostructure prepared by Example 1. FIG. 8B is an SEM image of a chiral metal nanostructure prepared by Example 4.

Referring to FIG. 8A, the chiral metal nanostructure formed using L-cysteine had a twisted corner. Specifically, the chiral metal nanostructure illustrated in FIG. 8A had a corner m which was rotated by $-\varphi$ degree from a straight line n obtained by connecting vertexes. Differently from this, the chiral metal nanostructure illustrated in FIG. 8B had a corner m' which was rotated by $+\varphi$ degree from a straight line n' obtained by connecting vertexes. That is, it was confirmed that the chiral metal nanostructure prepared using L-cysteine and the chiral metal nanostructure prepared using D-cysteine had chiral structures which rotate in opposite directions.

Figure 8C:
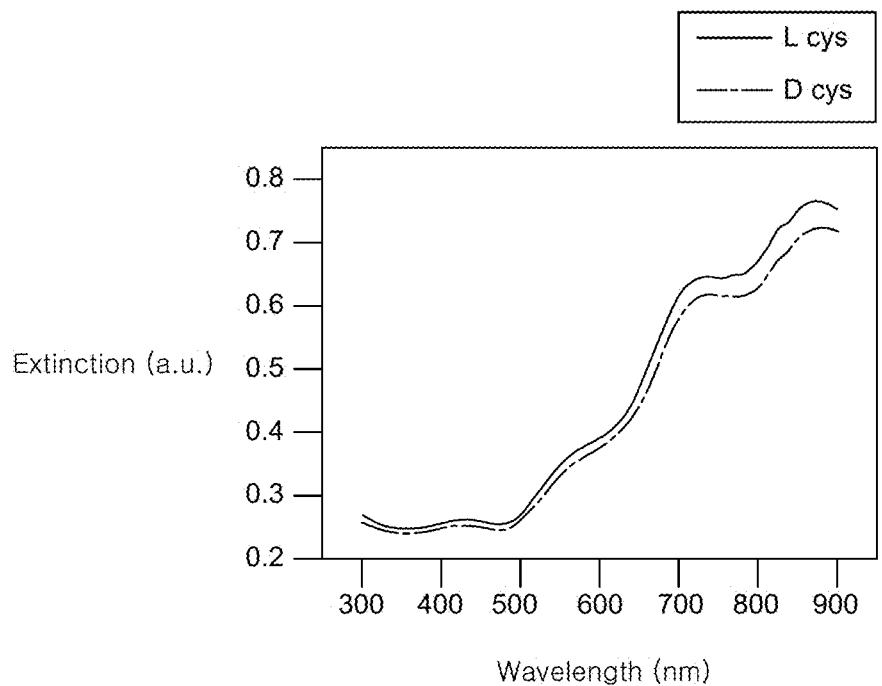
FIG. 8C is a graph illustrating an absorbance spectrum of a chiral metal nanostructure prepared by Examples 1 and 4 of the present disclosure.

FIG. 8C is a graph illustrating an absorbance spectrum of a chiral metal nanostructure prepared by Examples 1 and 4. Referring to FIG. 8C, it was confirmed that the metal nanostructures using L-cysteine and D-cysteine which were enantiomers had similar absorbance in a wavelength region.

Figure 8D:
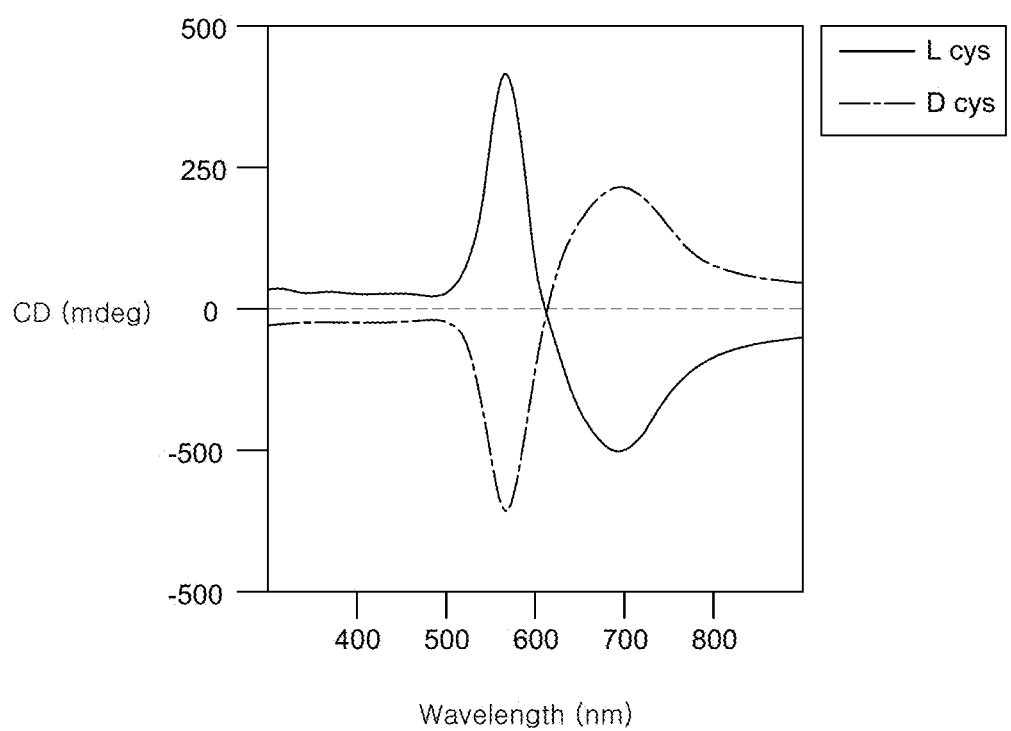
FIG. 8D is a graph illustrating a circular dichroism (CD) spectrum of a chiral metal nanostructure prepared by Examples 1 and 4 of this disclosure.

FIG. 8D is a graph illustrating a circular dichroism (CD) spectrum of a chiral metal nanostructure prepared by Examples 1 and 4. Referring to FIG. 8D, the chiral metal nanostructure prepared by Example 1 exhibited an absorption spectrum of a left circular polarization at 569 nm and a right circular polarization at 699 nm. In contrast, the chiral metal nanostructure prepared by Example 4 exhibited an absorption spectrum of a right circular polarization at 569 nm and a left circular polarization at 699 nm. That is, it was confirmed that both the chiral metal nanostructure prepared using L-cysteine and the chiral metal nanostructure prepared using D-cysteine had the same maximum peak and opposite polarization characteristics at 569 nm and 699 nm.

As shown in FIGS. 8A to 8D, chiral metal nanostructures having different structures and different optical characteristics can be prepared by using peptides having different chirality in the step of preparing chiral metal nanostructures. By varying the conditions of the peptides in the step of preparing the chiral metal nanostructure, various optical characteristics can be implemented and the optical characteristics of the chiral metal nanostructure can be encoded by data.

3. Content Ratio of D- and L-Forms of Peptide

In the encoding method according to one exemplary aspect of the present disclosure, the chiral structure and the optical characteristic of the prepared chiral metal nanostructure may vary depending on a mixing ratio of two peptides which are enantiomers. That is, the metal nanostructure having various chiral structures may be formed by adjusting a mixing ratio of two peptides which are enantiomers.

In order to examine the above description, the chiral metal nanostructure was prepared while changing a content ratio of L-cysteine and D-cysteine which were enantiomers. Specifically, the chiral metal nanostructure was prepared while changing a content ratio of L-cysteine and D-cysteine to 1:1, 2:1, 3:1, 1:2, and 1:3.

Figure 9A:
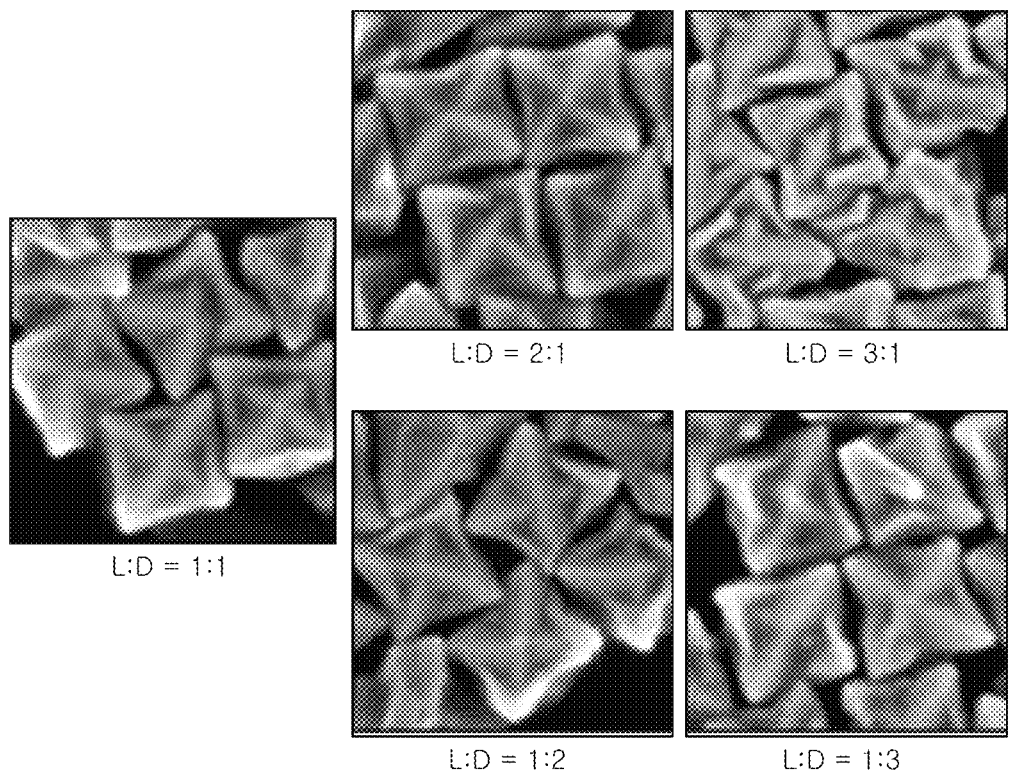
FIGS. 9A and 9B are an SEM image representing that when a content ratio of L-cysteine and D-cysteine is changed, the structure and the optical characteristic of the manufactured chiral metal nanostructure are changed and a graph illustrating a g-factor spectrum.
Figure 9B:
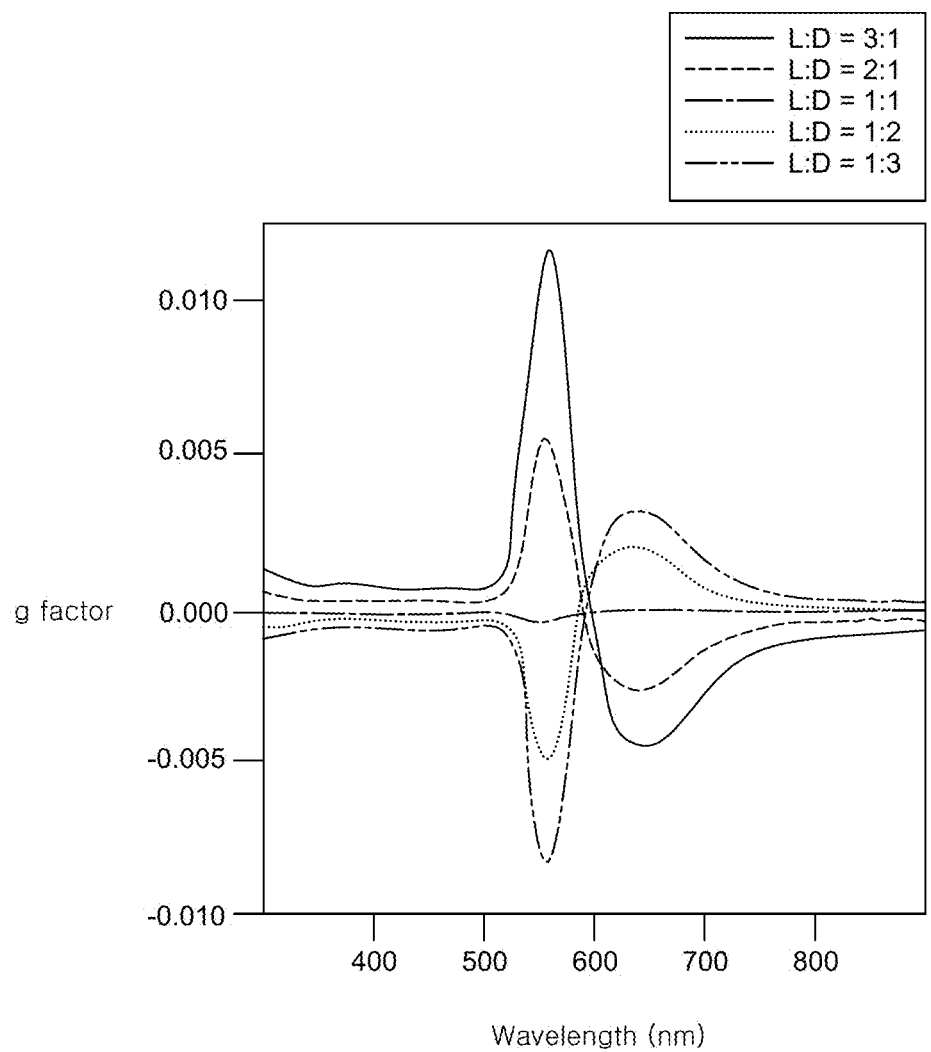

Meanwhile, FIGS. 9A and 9B are an SEM image representing that when a content ratio of L-cysteine and D-cysteine is changed, the structure and the optical characteristic of the prepared chiral metal nanostructure are changed and a graph illustrating a g-factor spectrum.

Referring to FIG. 9A, it was confirmed that when the content ratio of the L-cysteine and the D-cysteine having opposite chiral structures was changed, the structure of the prepared metal nanostructure was also changed. In particular, in the case of a racemic mixing state in which the content ratio of the L-cysteine and the D-cysteine is 1:1, the corner of the prepared metal nanostructure was formed to be substantially parallel to a corner of the initial metal seed particle so that a twisted corner was not formed. In this case, it was confirmed that the chiral of the metal nanostructure disappeared, and an achiral structure of the metal nanostructure was formed.

Further, referring to FIG. 9B, the chiral of the metal nanostructure may be quantitatively adjusted by changing a content ratio of the L-cysteine and the D-cysteine having opposite chiral structures. That is, the strength of the g-factor follows the property of more peptides between the L-cysteine and the D-cysteine. Similarly to FIG. 9A, it was confirmed that in the case of a racemic mixing state in which the content ratio of the L-cysteine and the D-cysteine was 1:1, the g-factor had a value close to 0 in the most of the wavelength region.

As shown in FIGS. 9A and 9B, in the step of preparing the chiral metal nanostructure, the content ratio of the two peptides as the enantiomer is controlled to prepare metal nano structures having various chiral structures. By varying the ratios of the plurality of peptides in the step of preparing the chiral metal nanostructure, various optical characteristics can be implemented, and the optical characteristics of the chiral metal nanostructure can be encoded by data.

4. Shape of Metal Seed Particle

In the encoding method according to an exemplary aspect of the present disclosure, the chiral structure and the optical characteristic of the prepared chiral metal nanostructure may vary depending on the shape of the metal seed particle. That is, the metal nanostructure having various chiral structures may be formed by changing a shape of the metal seed particle added to the second mixed solution.

In order to examine the above description, a metal nanostructure was formed by changing a shape of the metal nanostructure. Specifically, the above-described Example 3 in which a cube metal particle was used as a metal seed particle and Example 5 in which an octahedron metal particle was used as a metal seed particle were compared. Example 5 is specifically described below.

Example 5

The chiral metal nanostructure was prepared by the same method as Example 3 except that the octahedron metal seed particle was used instead of the cube metal seed particle.

That is, in Example 5, the octahedron metal seed particle was used as a metal seed particle and L-glutathione was used as a peptide.

Figure 10A:
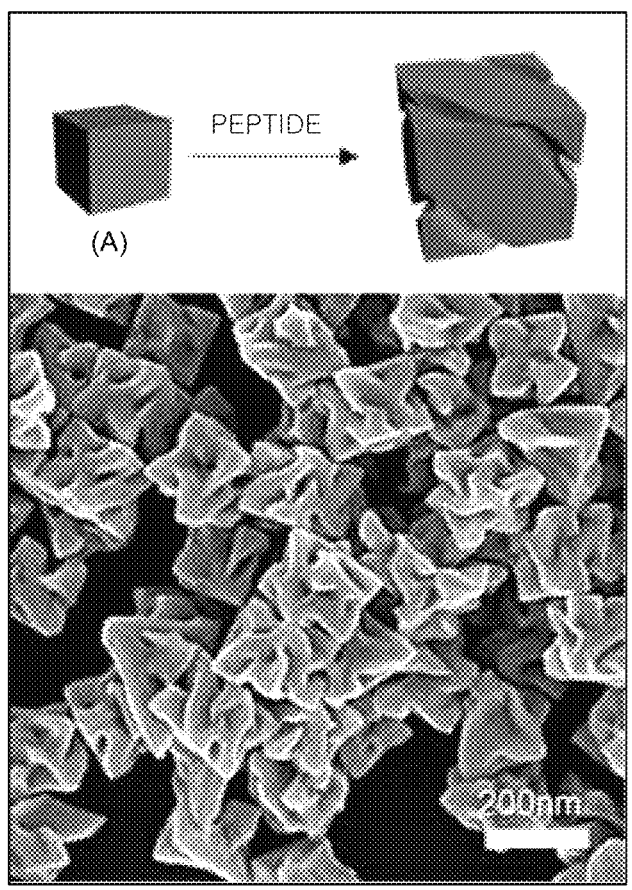
FIG. 10A is a schematic diagram and an SEM image of a chiral metal nanostructure prepared by Example 3 of the present disclosure.
Figure 10B:
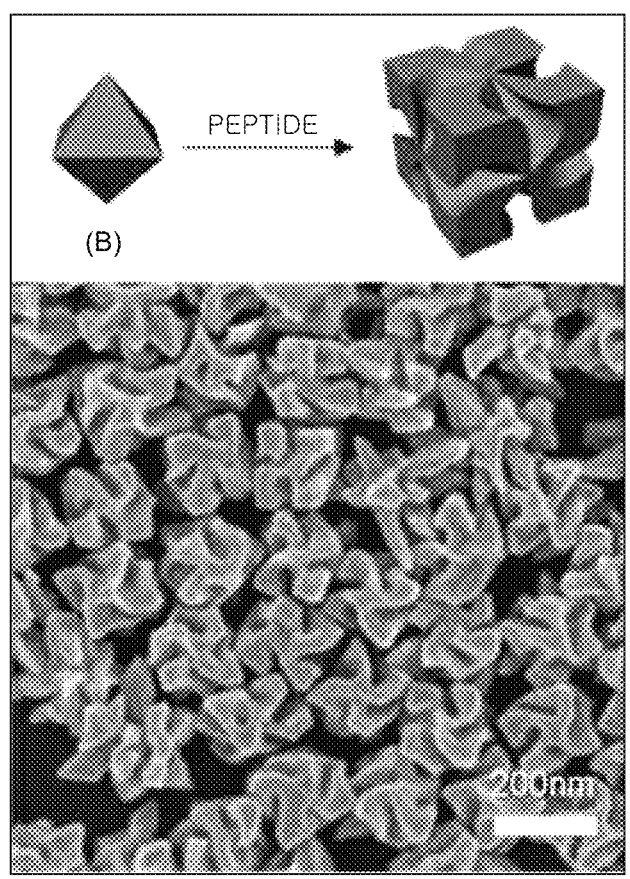
FIG. 10B is a schematic diagram and an SEM image of a chiral metal nanostructure prepared by Example 5 of the present disclosure.
Figure 10C:
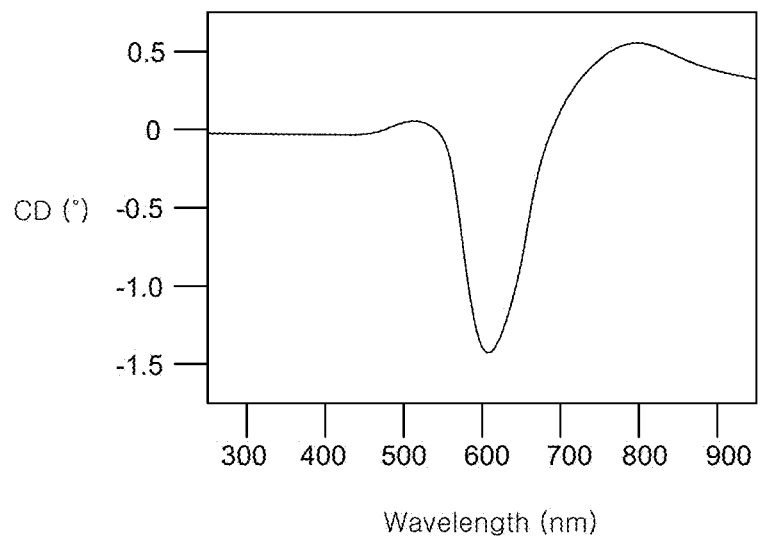
FIG. 10C is a graph showing of circular dichroism (CD) spectra of a chiral metal nanostructure prepared by Example 5 of the present disclosure.
Figure 10D:
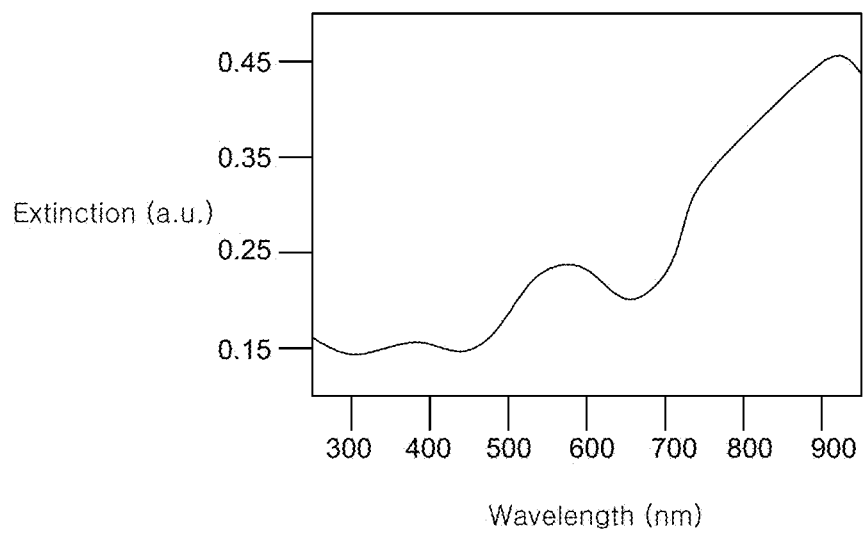
FIG. 10D is a graph illustrating an absorbance spectrum of a chiral metal nanostructure prepared by Example 5 of the present disclosure.

FIG. 10A is a schematic diagram and an SEM image of a chiral metal nanostructure prepared by Example 3. FIG. 10B is a schematic diagram and an SEM image of a chiral metal nanostructure prepared by Example 5. FIG. 10C is a graph illustrating a circular dichroism (CD) spectrum of a chiral metal nanostructure prepared by Example 5. FIG. 10D is a graph illustrating an absorbance spectrum of a chiral metal nanostructure prepared by Example 5. Referring to FIGS. 10C and 10D, it was confirmed that the metal nanostructure having different optical characteristics was formed by changing the shape of the metal seed particle.

Referring to FIGS. 10A and 10B, it was confirmed that when metal seed particles having different shapes were used, the metal nanostructures having different chiral structures could be formed after the growth of the metal.

Figure 10E:
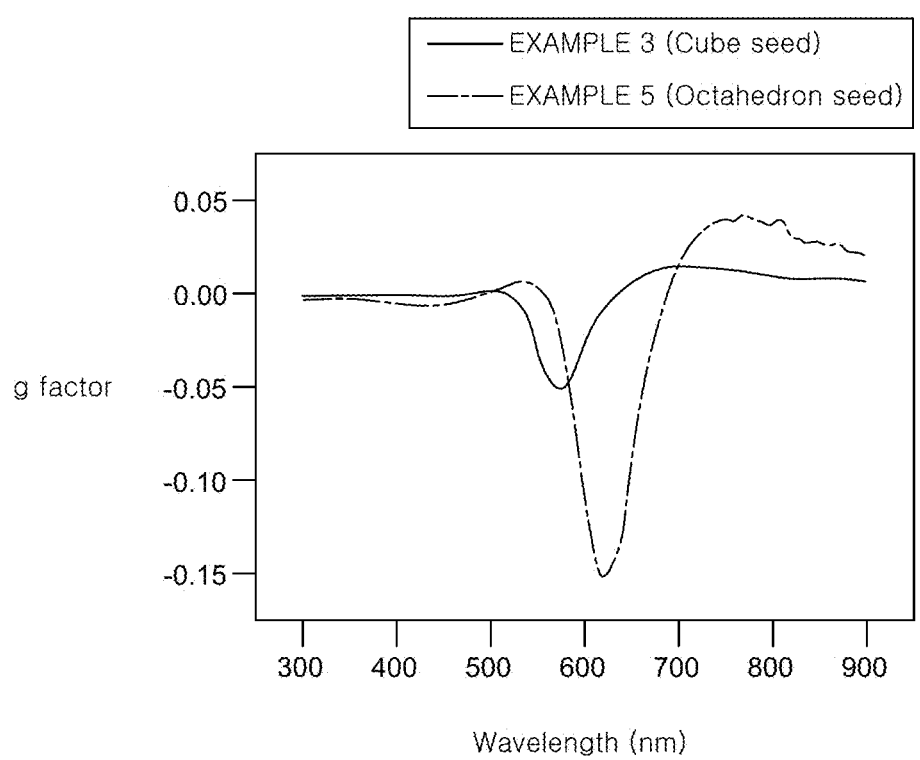
FIG. 10E is a graph illustrating a g-factor spectrum of a chiral metal nanostructure prepared by Examples 3 and 5 of the present disclosure.

FIG. 10E is a graph illustrating a g-factor spectrum of a chiral metal nanostructure prepared by Examples 3 and 5. Referring to FIG. 10E, it was confirmed that when the octahedron metal seed particle was used, the g-factor of the finally formed metal nanostructure was larger than that the case when the cube metal seed particle was used.

As shown in FIGS. 10A to 10E, by varying the structure of the metal seed particles in the step of preparing the chiral metal nanostructure, various optical characteristics can be implemented, and the optical characteristics of the chiral metal nanostructure can be encoded by data.

5. Concentration of Metal Seed Particle

In the encoding method according to an exemplary aspect of the present disclosure, the chiral structure and the optical characteristic of the prepared chiral metal nanostructure may vary depending on a concentration of a metal seed particle. That is, in the step S112, the metal nanostructure having various chiral structures may be formed by changing the content of the metal seed particle added to the second mixed solution.

In order to examine the above-description, a metal nanostructure was formed by changing the content of the metal seed particle injected into the second mixed solution. Specifically, in Example 5 in which the octahedron metal particle was used as a metal seed particle and L-glutathione was used as a peptide, the metal nanostructure was prepared while changing the concentration of the seed.

Figure 11:
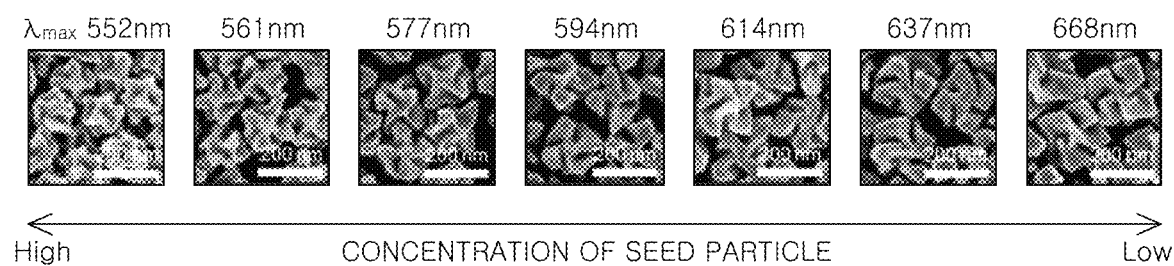
FIG. 11 is an SEM image of each of chiral metal nanostructures manufactured by varying a concentration of a metal seed particle.

FIG. 11 is an SEM image of each of chiral metal nanostructures manufactured by varying a concentration of a metal seed particle. In FIG. 11, a maximum absorption wavelength in a circular dichroism (CD) spectrum was also denoted.

Referring to FIG. 11, it was confirmed that as a concentration of the seed increased, that is, as the amount of the seed particles injected into the second mixed solution increased, the particle size of the prepared metal nanostructure was smaller. It was further confirmed that as the concentration of the seed particles was reduced, that is, as the amount of the seed particles injected into the second mixed solution was reduced, the particle size of the prepared metal nanostructure was larger. Since the metal precursor in the second mixed solution is limited, when the concentration of the metal seed particle is low, the amount of grown metals per one metal seed particle is increased. Therefore, larger metal nanostructure particles may be formed.

Meanwhile, when the size of the metal nanostructure was changed, a plasmon resonance of the metal nanostructure was changed so that the red shift or blue shift was generated. That is, it was confirmed that as the size of the metal nanostructure was increased, the maximum absorption wavelength in the circular dichroism (CD) spectrum moved to a red or blue wavelength region.

As shown in FIG. 11, by varying the concentration of the metal seed particles in the step of preparing the chiral metal nanostructure, various optical characteristics can be implemented, and the optical characteristics of the chiral metal nanostructure can be encoded by data.

6. Growth Time of Metal

In the method for manufacturing a chiral metal nanostructure according to an exemplary aspect of the present disclosure, a chiral structure of the prepared chiral metal nanostructure may vary depending on the growth time of metal. That is, the metal nanostructure having various chiral structures may be formed by adjusting a response time after injecting the metal seed particle into the second mixed solution.

Specifically, in the method for manufacturing a chiral metal nanostructure according to Examples 3 and 5, the metal nanostructure was prepared by varying the metal growth time after injecting the metal seed particle into the second mixed solution. In this case, FIG. 12 is an SEM image of each of a metal nanostructures manufactured by changing a metal growth time in Examples 3 and 5.

Figure 12:
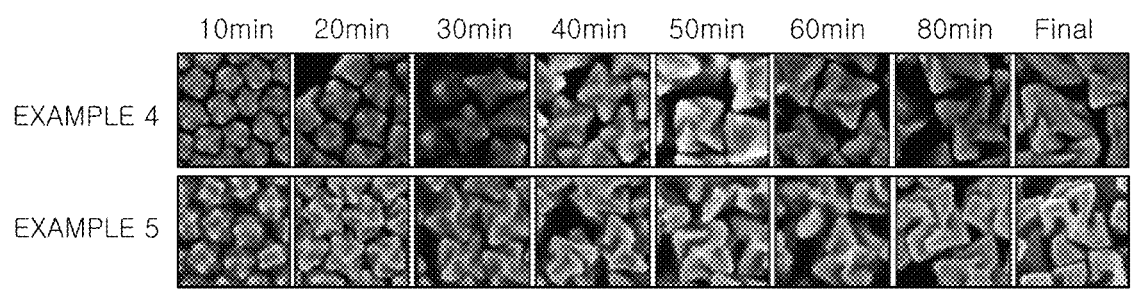
FIG. 12 is an SEM image of each chiral metal nanostructure manufactured by changing a metal growth time in Examples 3 and 5 of the present disclosure.

Referring to FIG. 12, it was confirmed that as the time elapsed, a chiral structure in which the corner further protrudes was formed. Therefore, by varying the reaction time in the step of preparing the chiral metal nano structure, chiral metal nanostructures having different structures may be prepared so that various optical characteristics can be implemented, and the optical characteristics of the chiral metal nanostructure can be encoded by data.

The encoding method according to an exemplary aspect of the present disclosure uses a chiral metal nano structure. Chiral metal nanostructures have different chiral structures by varying the conditions in the preparation process. The metal nanostructures having different structures also have different optical characteristics. Combination of various optical characteristics of metal nanostructures having various shapes causes astronomical cases. Thus, the optical characteristics of chiral metal nanostructures can be used as an encoding element and, as a result, it can be encrypted.

The encoding method of the present disclosure may use the optical characteristics of the chiral metal nanostructure to have an encoding capacity of 105 and may mix metal nanostructures having two or more chiral characteristics to an astronomical encoding capacity. Accordingly, the present disclosure can provide an encoding method in which a covert encryption technique and a track & trace encryption technique are combined.

Figure 13:
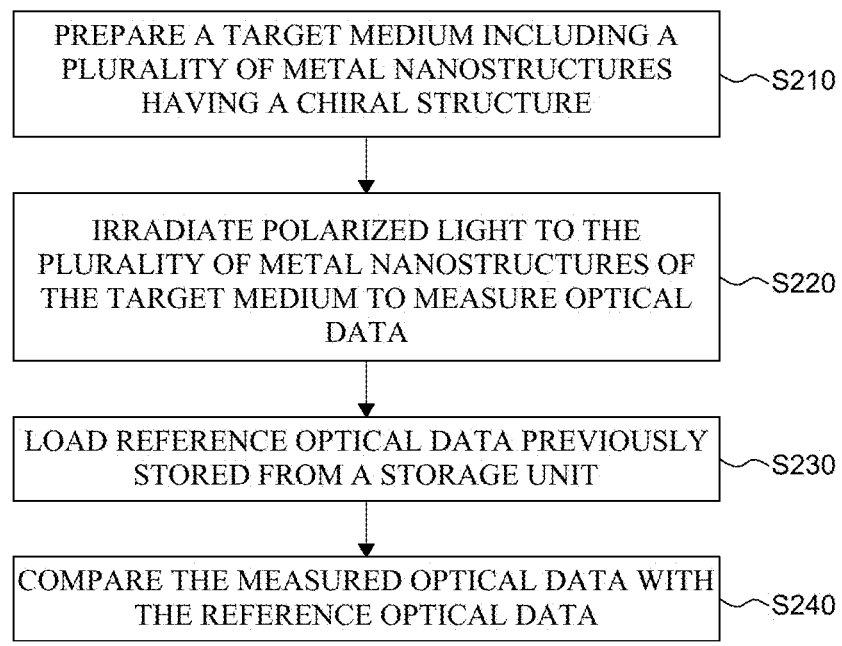
FIG. 13 is a flowchart for explaining a decoding method using a chiral metal nanostructure according to an exemplary aspect of the present disclosure.

FIG. 13 is a flowchart for explaining a decoding method using a chiral metal nanostructure according to an exemplary aspect of the present disclosure.

Referring to FIG. 13, the decoding method using a metal nanostructure according to an exemplary aspect of the present disclosure comprises a step S210 of preparing a target medium including a plurality of metal nanostructures having a chiral structure, a step S220 of irradiating polarized light to the plurality of metal nanostructures of the target medium to measure optical data, a step S230 of loading reference optical data previously stored from a storage unit, and a step S240 of comparing the measured optical data with the reference optical data.

First, a target medium including a plurality of metal nanostructures having a chiral structure is prepared (S210).

The target medium refers to an article for determining whether it is security or forgery. For example, the security medium encoded using the encoding method according to FIG. 1 may be the target medium.

Next, polarized light is irradiated to the plurality of metal nano structures of the target medium to measure optical data (S220).

Chiral metal nanostructures have different optical characteristics depending on the shape of the chiral structure. Specifically, optical data can be measured by irradiating polarized light on the extracted chiral metal nanostructure followed by analysis process. As described in the encoding method according to FIG. 1, the optical data may include (A) spectroscopic data and (B) color conversion pattern data measured from the metal nanostructure. Descriptions of overlapped contents related to optical data are omitted.

Meanwhile, the step of measuring optical data of the plurality of metal nanostructures of the target medium may further include a step of extracting a plurality of metal nano structures from the target medium. Specifically, it is a step of extracting a metal nanostructure having such an optical characteristic from a target medium before analyzing information related to the optical characteristic included in the target medium. For the extraction, a physical method or a chemical method may be used.

However, in the step of extracting a plurality of metal nano structures from a target medium, a plurality of metal nanostructures do not need to be physically separated from the target medium. In other words, the metal nanostructure can be separated from the target medium, and the optical data can be measured at a subsequent stage. However, optical data of the metal nano structure may be measured on a part of the target medium itself or the entire target medium without separate physical separation.

Next, reference optical data previously stored from a storage unit is loaded (S230).

In this regard, the reference optical data means optical data that is a criterion for determining whether or not it is security or forgery. That is, the reference optical data is optical data measured from chiral metal nanostructures prepared under specific conditions predetermined by a data value encoded by a user to distinguish security or genuine.

Next, the measured optical data with the reference optical data are compared (S240).

Specifically, optical data measured from a plurality of metal nanostructures extracted from a target medium are compared with reference optical data predetermined by a user, and decryption is performed by confirming whether or not they match.

When all the information of the measured optical data matches the reference optical data, it is confirmed that the target medium is a medium satisfying the security condition predetermined by the user. Further, it can be confirmed that the target medium is a genuine article which is not forged. However, if at least one of the information of the measured optical data does not match the reference optical data, it can be confirmed that the target medium does not satisfy the security condition. Further, it can be confirmed that the target medium is not a genuine article and is forged.

The decoding method according to an exemplary aspect of the present disclosure uses a chiral metal nano structure. Chiral metal nanostructures have different chiral structures by varying the conditions in the preparation process. The metal nanostructures having different structures also have different optical characteristics. Therefore, it is possible to determine whether the target medium is security or forgery by measuring various optical characteristics from a target medium to be checked for security or falsification and then comparing the optical characteristics of a predetermined chiral metal nanostructure in which security or genuine is authenticated.

In this regard, chiral metal nanostructures with various shapes can generate astronomical numbers by combining various optical characteristics. Data obtained by measuring the optical characteristics of the chiral metal nanostructure is used to realize a security technique having an encoding capacity of $10^5$ or more. Accordingly, the present disclosure can provide an encoding method in which a covert encryption technique and a track & trace encryption technique are combined and a decoding method for analyzing the encoding method.

According to an aspect of the present disclosure, an encoding method using a chiral metal nanostructure, the encoding method comprising, preparing a plurality of metal nanostructures having a chiral structure, obtaining optical data of the plurality of metal nanostructures, and preparing a security medium including the plurality of metal nanostructures.

The preparing of a plurality of metal nanostructures may include mixing a metal precursor, a surfactant, and a reducing agent to prepare a first mixed solution, adding a peptide to the first mixed solution to prepare a second mixed solution, and adding a plurality of metal seed particles to the second mixed solution to grow a the metal nanostructure.

The peptide may include one or more selected from the group consisting of cysteine (Cys), glutamate (Glu), alanine (Ala), glycine (Gly), penicillamine, histidine, lysine, ornithine, arginine, aspartic acid, glutamic acid, asparagine, glutathione and glutamine.

The peptide may be a monopeptide, a dipeptide or a tripeptide.

The plurality of metal seed particles may be at least one of gold, silver, and copper, and each of the plurality of metal seed particles may have a size of 1 nm to 100 nm.

Each of the plurality of metal nanostructures may include a concave portion and a convex portion, and the concave portion and the convex portion may be extended to be bent in one direction.

Each of the plurality of metal nanostructures may have a helicoid shape in which a corner is twisted in one direction.

The optical data may include at least one of spectroscopic data and color conversion pattern data measured from the metal nanostructure, and the spectroscopic data may include a circular dichroism (CD) spectrum, a g-factor spectrum, or an absorbance spectrum of the metal nano structure, and the color conversion pattern data may include a color change according to an angle change of polarized light irradiated to the metal nano structure.

The spectroscopic data may include a plurality of parameters obtained from the circular dichroism (CD) spectrum, the g-factor spectrum or the absorbance spectrum, respectively.

The obtaining of optical data of the plurality of metal nanostructures may include irradiating the plurality of metal nanostructures with polarized light to measure the spectroscopic data or the color conversion data and storing the measured spectroscopic data or the color conversion data.

The plurality of metal nanostructures may comprise a plurality of first metal nano structures having a first chiral structure and a plurality of second metal nano structures having a second chiral structure, the first chiral structure and the second chiral structure may have different shapes, and the spectroscopic data and the color conversion pattern data measured from the first metal nanostructure and the second metal nanostructure may be different from each other.

According to another aspect of the present disclosure, a decoding method using a chiral metal nano structure, the decoding method comprising preparing a target medium including a plurality of metal nano structures having a chiral structure, irradiating polarized light to the plurality of metal nanostructures of the target medium to measure optical data, loading reference optical data previously stored from a storage unit, and comparing the measured optical data with the reference optical data.

Each of the plurality of metal nanostructures may include a concave portion and a convex portion, and the concave portion and the convex portion may be extended to be bent in one direction.

The optical data may include at least one of spectroscopic data and color conversion pattern data measured from the plurality of metal nanostructure, the spectroscopic data may include a circular dichroism (CD) spectrum, a g-factor spectrum, or an absorbance spectrum of the metal nano structure, and the color conversion pattern data may include a color change according to an angle change of polarized light irradiated to the metal nano structure.

The reference optical data may be measured from a reference chiral metal nano structure produced under predetermined conditions to determine whether of security or forgery.

The plurality of metal nanostructures may comprise a plurality of first metal nano structures having a first chiral structure and a plurality of second metal nano structures having a second chiral structure, and the first chiral structure and the second chiral structure may have different shapes, and the spectroscopic data and the color conversion pattern data measured from the first metal nanostructure and the second metal nanostructure may be different from each other.

In comparing the measured optical data with the reference optical data, the security may be verified when the measured optical data matches the reference optical data, and the security may be not recognized when at least one of the measured optical data is different from the reference optical data.

Although the exemplary aspects of the present disclosure have been described in detail with reference to the accompanying drawings, the present disclosure is not limited thereto and may be embodied in many different forms without departing from the technical concept of the present disclosure. Therefore, the exemplary aspects of the present disclosure are provided for illustrative purposes only but not intended to limit the technical concept of the present disclosure. Therefore, the scope of the technical concept of the present disclosure is not limited thereto. Therefore, it should be understood that the above-described exemplary aspects are illustrative in all aspects and do not limit the present disclosure. The protective scope of the present disclosure should be construed based on the following claims, and all the technical concepts in the equivalent scope thereof should be construed as falling within the scope of the present disclosure.

The invention claimed is:

1. An encoding method using a chiral metal nanostructure, the encoding method comprising:
   preparing a plurality of metal nanostructures having a chiral structure;
   obtaining optical data of the plurality of metal nanostructures; and
   preparing a security medium including the plurality of metal nanostructures.

2. The encoding method according to claim 1, wherein the preparing of a plurality of metal nanostructures includes:
   mixing a metal precursor, a surfactant, and a reducing agent to prepare a first mixed solution;
   adding a peptide to the first mixed solution to prepare a second mixed solution; and
   adding a plurality of metal seed particles to the second mixed solution to grow the plurality of metal nanostructures.

3. The encoding method according to claim 2, wherein the peptide includes one or more selected from the group consisting of cysteine (Cys), glutamate (Glu), alanine (Ala), glycine (Gly), penicillamine, histidine, lysine, ornithine, arginine, aspartic acid, glutamic acid, asparagine, glutathione and glutamine.

4. The encoding method according to claim 3, wherein the peptide is a monopeptide, a dipeptide or a tripeptide.

5. The encoding method according to claim 2, wherein the plurality of metal seed particles is at least one of gold, silver, and copper, and each of the plurality of metal seed particles has a size of 1 nm to 100 nm.

6. The encoding method according to claim 1, wherein each of the plurality of metal nanostructures includes a concave portion and a convex portion, and
   wherein the concave portion and the convex portion are extended to be bent in one direction.

7. The encoding method according to claim 1, wherein each of the plurality of metal nanostructures has a helicoid shape in which a corner is twisted in one direction.

8. The encoding method according to claim 1, wherein the optical data includes at least one of spectroscopic data and color conversion pattern data measured from the plurality of metal nanostructures,
   wherein the spectroscopic data includes one of a circular dichroism (CD) spectrum, a g-factor spectrum and an absorbance spectrum of the plurality of metal nanostructures, and
   wherein the color conversion pattern data includes a color change according to an angle change of polarized light irradiated to the plurality of metal nanostructures.

9. The encoding method according to claim 8, wherein the spectroscopic data includes a plurality of parameters obtained from one of the circular dichroism (CD) spectrum, the g-factor spectrum or the absorbance spectrum.

10. The encoding method according to claim 8, wherein the obtaining of optical data of the plurality of metal nanostructures includes:
    irradiating the plurality of metal nanostructures with polarized light to measure the spectroscopic data or the color conversion data; and
    storing the measured spectroscopic data or the color conversion data.

11. The encoding method according to claim 1, wherein the plurality of metal nanostructures comprises a plurality of first metal nanostructures having a first chiral structure and a plurality of second metal nanostructures having a second chiral structure,
    wherein the first chiral structure and the second chiral structure have different shapes, and
    wherein the spectroscopic data and the color conversion pattern data measured from the first metal nanostructure and the second metal nanostructure are different from each other.

12. A decoding method using a chiral metal nanostructure, the decoding method comprising:
    preparing a target medium including a plurality of metal nanostructures having a chiral structure;

irradiating polarized light to the plurality of metal nanostructures of the target medium to measure optical data;

loading reference optical data previously stored from a storage unit; and comparing the measured optical data with the reference optical data.

13. The decoding method according to claim 12, wherein each of the plurality of metal nanostructures includes a concave portion and a convex portion, and wherein the concave portion and the convex portion are extended to be bent in one direction.

14. The decoding method according to claim 12, wherein the optical data includes at least one of spectroscopic data and color conversion pattern data measured from the plurality of metal nanostructure, wherein the spectroscopic data includes one of a circular dichroism (CD) spectrum, a g-factor spectrum, or an absorbance spectrum of the metal nanostructure, and wherein the color conversion pattern data includes a color change according to an angle change of polarized light irradiated to the metal nanostructure.

15. The decoding method according to claim 12, wherein the reference optical data is measured from a reference chiral metal nanostructure produced under predetermined conditions to determine security breach or forgery.

16. The decoding method according to claim 12, wherein the plurality of metal nanostructures comprises a plurality of first metal nanostructures having a first chiral structure and a plurality of second metal nanostructures having a second chiral structure, wherein the first chiral structure and the second chiral structure have different shapes, and wherein the spectroscopic data and the color conversion pattern data measured from the first metal nanostructure and the second metal nanostructure are different from each other.

17. The decoding method according to claim 12, wherein in the comparing the measured optical data with the reference optical data, the security is verified when the measured optical data matches the reference optical data, and the security is not recognized when at least one of the measured optical data is different from the reference optical data.

\* \* \* \* \*